(12) United States Patent
Nakagawa et al.

(10) Patent No.: US 7,223,817 B2
(45) Date of Patent: May 29, 2007

(54) POLYMER, PROCESSES FOR PRODUCING POLYMER AND COMPOSITION

(75) Inventors: Yoshiki Nakagawa, Kobe (JP); Kenichi Kitano, Kobe (JP); Masayuki Fujita, Kobe (JP)

(73) Assignee: Kaneka Corporation, Osaka (JP)

( * ) Notice: Subject to any disclaimer, the term of this patent is extended or adjusted under 35 U.S.C. 154(b) by 146 days.

(21) Appl. No.: 11/134,354

(22) Filed: May 23, 2005

(65) Prior Publication Data

US 2005/0222332 A1  Oct. 6, 2005

Related U.S. Application Data

(62) Division of application No. 09/786,325, filed as application No. PCT/JP99/04748 on Sep. 2, 1999, now Pat. No. 6,930,147.

(30) Foreign Application Priority Data

| Sep. 2, 1998 | (JP) | ................... 10-247665 |
| Sep. 14, 1998 | (JP) | ................... 10-260193 |
| Sep. 14, 1998 | (JP) | ................... 10-260194 |

(51) Int. Cl.
*C08F 8/00* (2006.01)

(52) U.S. Cl. .................. 525/105; 525/100; 525/106

(58) Field of Classification Search ................ 525/100, 525/105, 106
See application file for complete search history.

(56) References Cited

U.S. PATENT DOCUMENTS

| 5,093,389 | A | 3/1992 | Shimizu |
| 5,369,206 | A | 11/1994 | Kamei et al. |
| 5,741,859 | A | 4/1998 | Saxena et al. |
| 5,763,548 | A | 6/1998 | Matjaszewski et al. |
| 5,789,487 | A | 8/1998 | Matyjaszewski et al. |
| 5,807,937 | A | 9/1998 | Matyjaszewski et al. |
| 5,811,479 | A | 9/1998 | Labauze |
| 6,259,798 | B1 | 7/2001 | Takeda |
| 6,275,280 | B1 | 8/2001 | Kajita et al. |
| 6,278,233 | B1 | 8/2001 | Sanou et al. |
| 6,552,118 | B2 | 4/2003 | Fujita et al. |

FOREIGN PATENT DOCUMENTS

| EP | 0 789 036 A2 | 2/1997 |
| EP | 0 816 385 A1 | 6/1997 |
| EP | 0786493 A | 7/1997 |
| EP | 0 845 479 A2 | 6/1998 |
| JP | 58167606 | 10/1983 |
| JP | 60123518 | 7/1985 |
| JP | 62-148927 | 7/1987 |
| JP | 3-2831 | 1/1991 |
| JP | 3-293328 | 12/1991 |
| JP | 403293328 | 12/1991 |
| JP | 4-42126 | 2/1992 |
| JP | 4204417 | 7/1992 |
| JP | 4-256925 | 9/1992 |
| JP | 4042126 | 12/1992 |
| JP | 5-53121 | 3/1993 |
| JP | 5-61052 | 3/1993 |
| JP | 5-66407 | 3/1993 |
| JP | 5061052 | 3/1993 |
| JP | 5066407 | 3/1993 |
| JP | 5-150248 | 6/1993 |
| JP | 5-150249 | 6/1993 |
| JP | 5-216050 | 8/1993 |
| JP | 5-333345 | 12/1993 |
| JP | 5-333346 | 12/1993 |
| JP | 6-67184 | 3/1994 |
| JP | 6-250194 | 9/1994 |
| JP | 6-347806 | 12/1994 |
| JP | 8-76132 | 3/1996 |
| JP | 409005755 | 1/1997 |
| JP | 9-208749 A | 8/1997 |
| WO | WO-96/30421 | 10/1996 |
| WO | WO-97/18247 | 5/1997 |
| WO | WO-98/01480 | 1/1998 |
| WO | WO-98/40415 | 9/1998 |

*Primary Examiner*—Bernard Lipman
(74) *Attorney, Agent, or Firm*—Connolly, Bove, Lodge & Hutz, LLP

(57) ABSTRACT

The present invention relates to a vinyl polymer terminated in a silanol group, a hydrolyzable silyl group or an acrylic functional group,
   to a method of producing a vinyl polymer having a hydrolyzable silyl group at one or more termini thereof which comprises reacting a vinyl polymer having a silanol group at one or more termini thereof with a silicon compound having two or more silicon atom-bound hydrolyzable groups,
   and a method of producing a vinyl polymer having an acrylic functional group at one or more termini thereof which comprises reacting a vinyl polymer having a silanol group at one or more termini thereof
   with a silicon compound represented by the general formula (3):

$$XSiR_2-G-O-C(O)C(L)=CH_2 \qquad (3)$$

wherein X is a hydrolyzable group.

13 Claims, No Drawings

POLYMER, PROCESSES FOR PRODUCING POLYMER AND COMPOSITION

CROSS-REFERENCE TO RELATED APPLICATION

This application is a division of U.S. patent application Ser. No. 09/786,325 filed Jun. 11, 2001, now U.S. Pat. No. 6,930,147, which is a 371 of PCT/JP99/04748 filed Sep. 2, 1999 the entire contents of which are incorporated herein by this reference.

TECHNICAL FIELD

The present invention relates to a vinyl polymer terminated in a silanol group, a hydrolyzable silyl group or an acrylic functional group, to a method of producing such polymer and to a curable composition comprising the polymer.

BACKGROUND ART

Vinyl polymers, in particular (meth)acrylic polymers, having a crosslinking silyl group(s) within the molecule are used in highly weathering-resistant coatings utilizing the high weathering resistance owing to the main chain and crosslinking point(s) thereof. These (meth)acrylic polymers are generally produced by copolymerizing a (meth)acrylic monomer having a crosslinking silyl group(s) with another monomer or other monomers and, therefore, crosslinking silyl groups occur randomly in the molecular chain. It is thus difficult to use them in lieu of rubbers. On the other hands, attempts have been made to produce crosslinking silyl-terminated (meth)acrylic polymers and use them in sealing or adhesive compositions. As for the production of crosslinking silyl-terminated (meth)acrylic polymers, Japanese Kokoku Publication Hei-03-14068, for instance, discloses a method which comprises polymerizing a (meth)acrylic monomer(s) in the presence of a crosslinking silyl-containing mercaptan, a crosslinking silyl-containing disulfide and a crosslinking silyl-containing radical polymerization initiator, and Japanese Kokoku Publication Hei-04-55444 discloses a method which comprises polymerizing an acrylic monomer(s) in the presence of a crosslinking silyl-containing hydrosilane compound or a tetrahalosilane. Further, Japanese Kokai Publication Hei-06-211922 describes a method of producing crosslinking silyl-terminated (meth)acrylic polymers which comprises synthesizing a hydroxyl-terminated acrylic polymer using a hydroxyl-containing polysulfide in excess of an initiator and further converting the hydroxy group(s).

As a general method of introducing a crosslinking silyl group into a polymer terminus or termini, there may be mentioned the use of the hydrosilylation reaction involving a polymer terminus alkenyl group(s). However, compounds having both a silanol group and a hydrosilyl group are unstable and difficult to obtain and, therefore, it is difficult to introduce a silanol group(s) into a polymer terminus or termini by this method.

On the other hand, among crosslinking silyl groups, the silanol group is highly reactive and frequently used in the field of silicones, in particular, utilizing its high reactivity. However, almost no silanol-terminated polymers other than silicones are known since the production thereof is difficult as discussed above.

Further, among crosslinking silyl groups, ketoximo groups, acyloxy and like groups are highly reactive and are frequently used in the field of silicones, in particular, utilizing their high reactivity. However, almost no ketoximo- or acyloxy-terminated polymers other than silicones are known since the production thereof is difficult as discussed above.

Meanwhile, it is known that alkenyl-terminated polymers can crosslink by themselves or be crosslinked by using a curing agent such as a hydrosilyl-containing compound to give curing products excellent in heat resistance and durability. As the main chain skeletons of such polymers, there may be mentioned polyether polymers such as polyethylene oxide, polypropylene oxide and polytetramethylene oxide; hydrocarbon polymers such as polybutadiene, polyisoprene, polychloroprene, polyisobutylene, and hydrogenation products derived therefrom; polyester polymers such as polyethylene terephthalate, polybutylene terephthalate and polycaprolactone; and polysiloxane polymers such as polydimethylsiloxane, among others, and these are used in various fields according to the characteristics of the respective main chain skeletons.

(Meth)acrylic polymers have those characteristics which other polymers such as mentioned above cannot have, for example high weathering resistance and heat resistance, oil resistance and transparency, and the use of some having an alkenyl group(s) on a side chain(s) in highly weathering resistant coatings has been proposed (e.g. Japanese Kokai Publication Hei-03-277645, Japanese Kokai Publication Hei-07-70399). However, alkenyl-terminated (meth)acrylic polymers are difficult to produce, hence have hardly been put into practical use.

Japanese. Kokai Publication Hei-01-247403 discloses a method of producing acrylic polymers having an alkenyl group at both termini which uses an alkenyl-containing dithiocarbamate or diallyl disulfide as a chain transfer agent.

Further, Japanese Kokai Publication Hei-06-211922 discloses a method of producing alkenyl-terminated acrylic polymers which comprises producing a hydroxyl-terminated acrylic polymer using a hydroxyl-containing polysulfide or an alcohol compound as a chain transfer agent and further utilizing the reactivity of the hydroxyl group.

On the other hand, curable rubber-like elastomer compositions are widely used as adhesives, sealants and shock absorbers. According to the curing means, these are roughly classifiable into the so-called moisture-curable compositions which are stable under tightly closed conditions but cured by the action of moisture at room temperature to give rubber-like elastomers and compositions undergoing the crosslinking reaction upon heating, for example through the hydrosililation reaction.

However, it is difficult by the methods mentioned above to introduce an alkenyl group terminally into a polymer with certainty. Further, these methods generally use radical polymerization and, therefore, the polymers obtained have a broad molecular weight distribution (ratio of weight average molecular weight to number average molecular weight), which is generally not less than 2, and, accordingly, show a high viscosity, which is a problem. When the viscosity is high, problems arise, for example handling in application as a sealing agent or adhesive, for instance, becomes difficult or it is impossible to incorporate a large amount of a reinforcing filler.

Furthermore, it is not easy to introduce a radical-polymerizable acrylic functional group into (meth)acrylic polymers polymerized by radical polymerization. In particular, almost no oligomer compounds with an acrylic functional group introduced terminally thereinto have been synthesized.

On the other hand, in photocurable compositions, low-molecular compounds having an acrylic functional group(s) are used in many instances. In this case, the odor resulting from evaporation of low-boiling unreacted compounds during and after curing is a great problem. For avoiding this problem, oligomers having an acrylic functional group(s) are used. However, mainly from the synthesis viewpoint, such oligomers are restricted to the epoxy-acrylate, urethane-acrylate, polyester-acrylate and like types, and few oligomers having a high molecular weight are available. As a result, the curing products derived from them tend to become relatively hard ones. Any products having good rubber elasticity cannot be obtained.

SUMMARY OF THE INVENTION

In view of the state of the art mentioned above, it is an object of the present invention to provide a vinyl polymer having a silanol group, hydrolyzable silyl group or acrylic functional group at a molecular terminus or termini with a well controlled structure, a method of producing the same and, further, a curable composition comprising the same.

In a first aspect, the invention provides a vinyl polymer (I) having a silanol group at one or more termini thereof
and a curable composition comprising the same.

In a second aspect, the invention provides a method of producing a vinyl polymer (II) having a hydrolyzable silyl group at one or more termini thereof
which comprises reacting a vinyl polymer (I) having a silanol group at one or more termini thereof
with a silicon compound having two or more silicon atom-bound hydrolyzable groups,
said vinyl polymer (II) having a hydrolyzable silyl group at one or more termini thereof and obtainable by the above production method,
and a curable composition comprising the same.

In a third aspect, the invention provides a method of producing a vinyl polymer (III) having an acrylic functional group at one or more termini thereof
which comprises reacting a vinyl polymer (I) having a silanol group at one or more termini thereof
with a silicon compound represented by the general formula (3):

$$XSiR_2—G—O—C(O)C(L)=CH_2 \quad (3)$$

wherein R is a hydrocarbon group containing 1 to 14 carbon atoms or a halogenated hydrocarbon group containing 1 to 10 carbon atoms and the two R groups may be the same or different, X is a hydrolyzable group, G is an alkylene group containing 1 to 4 carbon atoms and L is a hydrogen atom or a hydrocarbon group containing 1 to 20 carbon atoms,
said vinyl polymer (III) having an acrylic functional group at one or more termini thereof and obtainable by the above production method,
and a curable composition comprising the same.

In the following, the invention is described in detail.

DETAILED DISCLOSURE OF THE INVENTION

The invention, in its first aspect, lies in a vinyl polymer (I) having a silanol group at one or more termini thereof.

The silanol group is not particularly restricted but includes, as examples thereof, groups represented by the general formula (1):

$$—[Si(R^1)_{2-b}(OH)_bO]_m—Si(R_2)_{3-a}(OH)_a \quad (1)$$

wherein $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $(R')_3SiO—$, in which R' is a monovalent hydrocarbon group containing 1 to 20 carbon atoms and the three R' groups may be the same or different, when there are two or more $R^1$ or $R^2$ groups, they may be the same or different, a represents 0, 1, 2 or 3, b represents 0, 1 or 2, and m is an integer of 0 to 19, provided that the relation $a+mb \geqq 1$ should be satisfied. Among them, those silanol groups of the general formula (1) in which m=0 are preferred, though without any restrictive meaning.

As specific examples of $R^1$ and $R^2$, there may be mentioned the following, without any restrictive meaning:

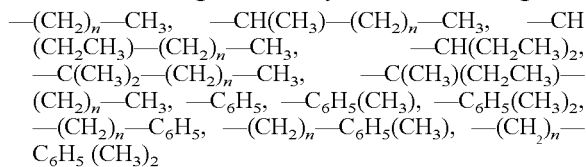

(n being an integer of not less than 0 and the total number of carbon atoms in each group being not more than 20).

More specifically, the group $—Si(CH_3)_2OH$ is preferred as the silanol group to be used in the practice of the invention.

The monomer constituting the main chain of the vinyl polymer (I) according to the first aspect of the invention is not particularly restricted but may be any of various monomers. As examples, there maybe mentioned (meth)acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers (also referred to as aromatic vinyl monomers in the present specification) such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile;

amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. In the case of copolymerization, both random copolymerization and block copolymerization may be employed. Preferred among these monomers, from the viewpoint of physical properties of products, among others, are (meth)acrylic monomers, acrylonitrile monomers, aromatic vinyl monomers, fluorine-containing vinyl monomers and silicon-containing vinyl monomers. More preferred are acrylic ester monomers and methacrylic ester monomers. Butyl acrylate is still more preferred. In the practice of the present invention, these preferred monomers may be copolymerized with other monomers and, in such cases, the content of these preferred monomers is preferably not less than 40% by weight. The expression "(meth) acrylic acid", for instance, so referred to hereinabove means "acrylic acid and/or methacrylic acid".

The molecular weight distribution, namely the ratio (Mw/Mn) of weight average molecular weight (Mw) to number average molecular weight (Mn), of the vinyl polymer (I) according to the first aspect of the invention is not particularly restricted. For facilitating the handling by keeping the viscosity of the curable composition, when this is prepared, at a low level while securing sufficient curing product physical properties, however, a narrow molecular weight distribution is preferred. Preferred as the molecular weight distribution value is a value not more than 1.8, more preferably not more than 1.7, still more preferably not more than 1.6, still more preferably not more than 1.5, still more preferably not more than 1.4, still more preferably not more than 1.3. The molecular weight distribution is determined most commonly by gel permeation chromatography (GPC). The number average molecular weight and so on can be determined on the polystyrene equivalent basis using chloroform or THF as the mobile phase and polystyrene gel columns as columns.

The number average molecular weight of the vinyl polymer (I) according to the first aspect of the invention is not particularly restricted but is preferably within the range of 500 to 100,000. At a molecular weight smaller than 500, the characteristics intrinsic in the vinyl polymer are hardly manifested and, at above 100,000, the handling may become difficult in some instances.

<Production of Silanol-terminated Vinyl Polymer (I)>

In the following, a method of producing the vinyl polymer having a silanol group at one or more termini thereof, according to the first aspect of the invention, is described. The method shown herein has no limitative meaning, however. As for an appropriate method of producing silanol-containing polymers, reference may be made to an article by P. D. Lickiss in Advances in Inorganic Chemistry, vol. 42, page 142 (1995).

Basically, the vinyl polymer (I) according to the first aspect of the invention is produced by polymerizing a vinyl monomer(s), introducing an alkenyl group thereinto by some or other method, subjecting the thus-obtained vinyl polymer having the alkenyl group at one or more termini thereof to hydrosilylation reaction with a silicon compound having both a silicon atom-bound hydrolyzable group and a hydrosilyl group, and then converting this hydrolyzable group to a silanol group by hydrolysis.

In the following, this process is described in detail.

<Polymerization>

First, a vinyl polymer having a specific functional group(s) such as an alkenyl group(s) is synthesized by polymerizing a vinyl monomer (s). The method of polymerization is not particularly restricted but radical polymerization is preferred in view of the wide range of usable monomers and the simple and easy polymerization procedure. The techniques of radical polymerization can be classified into techniques of "ordinary radical polymerization" comprising simply copolymerizing a monomer having a specific functional group with a vinyl monomer(s) using an azo compound or peroxide as a polymerization initiator, and techniques of "controlled radical polymerization" by which a specific functional group can be introduced into a controlled site(s) such as a terminus or termini.

"Ordinary radical polymerization" is easy and simple to perform but, by this method, the monomer having a specific functional group(s) is introduced into the polymer according to the probability. Thus, there arise problems; for obtaining highly functionalized polymers, it is necessary to use this monomer in fairly large amounts and, conversely when it is used in a small amount, the proportion of polymers formed without introduction of that specific functional group increases. Further, since it involves free radical polymerization, the rate of polymerization is high and such a termination reaction as radical-to-radical coupling is apt to occur, so that it is difficult to control the polymerization. As a result, there also arises the problem that only polymers having a broad molecular weight distribution and a high viscosity are obtained.

The techniques of "controlled radical polymerization" can further be classified into "chain transfer agent methods" by which functional group-terminated vinyl polymers can be obtained by carrying out the polymerization using a chain transfer agent having a specific functional group(s), and "living radical polymerization techniques" by which polymers having a molecular weight substantially as designed can be obtained owing to the fact that a growing polymerization terminus grows without causing any termination reaction.

The "chain transfer agent methods" can give polymers having a high rate of functionalization but they require the chain transfer agent having a specific functional group(s) in fairly large amounts relative to the initiator. Economical problems thus arise, involving treatment-related ones. Since they involve free radical polymerization, like in "ordinary radical polymerization", other problems arise; the molecular weight distribution becomes broad and only polymers having a high viscosity are obtained.

Unlike these polymerization methods, "living radical polymerization" hardly undergoes termination reactions, gives polymers with a narrow molecular weight distribution (about 1.1 to 1.5 in terms of Mw/Mn) and, in addition, makes it possible to freely control the molecular weight by selecting the monomer/initiator charge ratio. Therefore, "living radical polymerization" can give polymers with a narrow molecular weight distribution and a low viscosity and allows introduction of the monomer having a specific functional group(s) into a substantially arbitrary site(s), hence, it is preferred as a method of producing the above vinyl polymer having a specific functional group(s)

While, in its narrow sense, the term "living polymerization" means the polymerization in which molecular chains grow while the terminal activity is always maintained, it generally includes pseudo-living polymerization in which terminally inactivated species and terminally active species are in equilibrium. It is the latter definition that applies in the present invention.

In recent years, "living radical polymerization" has been actively studied by a number of groups. As examples, there may be mentioned, among others, the technique which uses a cobalt-porphyrin complex as described in J. Am. Chem. Soc, 1994, vol. 116, page 7943, the technique which uses such a radical capping agent as a nitroxide compound shown in Macromolecules, 1994, vol. 27, page 7228, and the atom transfer radical polymerization (ATRP) technique using an organic halide or the like as an initiator and a transition metal complex as a catalyst.

Among the "living radical polymerization" techniques, the "atom transfer radical polymerization" technique, which comprises polymerizing a vinyl monomer(s) using an organic halide or sulfonyl halide compound as an initiator and a transition metal complex as a catalyst, not only has the characteristics of the above-mentioned "living radical polymerization" but also uses a terminal halogen or the like, which is relatively advantageous in functional group conversion reactions, and affords a higher degree of freeness in initiator and catalyst designing, hence it is more preferred as the method of producing vinyl polymers having a specific functional group(s). As specific references to this atom transfer radical polymerization, there may be mentioned Matyjaszewski et al. J. Am. Chem. Soc., 1995, vol. 117, page 5614; Macromolecules, 1995, vol. 28, page 7901; Science, 1996, vol. 272, page 866; WO 96/30421; WO 97/18247; and Sawamoto et al., Macromolecules, 1995, vol. 28, page 1721, among others.

First, the technique which uses a radical capping agent such as a nitroxide compound is described. In this polymerization, a nitroxy free radical (=N—O.), which is generally stable, is used as the radical capping agent. While such a compound is not restricted, nitroxy free radicals from cyclic hydroxy amines, such as the 2,2,6,6-substituted-1-piperidinyloxy radical and 2,2,5,5-substituted-1-pyrrolidinyloxy radical, are preferred. Appropriate as the substituents are alkyl groups containing not more than 4 carbon atoms, such as methyl and ethyl groups. Specific nitroxy free radical compounds include, but are not limited to, the 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylamine-oxy radical, among others. Such a stable free radical as the galvinoxyl free radical may be used in lieu of the nitroxy free radical.

The above radical capping agent is used in combination with a radical generator. It is presumable that the reaction product from a radical capping agent and a radical generator serve as a polymerization initiator and the polymerization of an addition-polymerizable monomer(s) thereby proceed. The mixing ratio of both is not particularly restricted but the radical initiator is appropriately used in an amount of 0.1 to 10 moles per mole of the radical capping agent.

Although various compounds can be used as the radical generator, a peroxide capable of generating a radical under polymerization temperature conditions is preferred. Such peroxide include, but is not limited to, diacyl peroxides such as benzoyl peroxide and lauroyl peroxide, dialkyl peroxides such as dicumyl peroxide and di-tert-butyl peroxide, peroxydicarbonates such as diisopropyl peroxydicarbonate and bis(4-tert-butylcyclohexyl) peroxydicarbonate, alkyl peresters such as tert-butyl peroxyoctoate and tert-butyl peroxy-benzoate, and the like. In particular, benzoyl peroxide is preferred. Further, another radical generator, for example a radical-generating azo compound such as azobisisobutyronitrile, may be used in lieu of the peroxide.

As reported in Macromolecules, 1995, vol. 28, page 2993, such alkoxyamine compounds as shown below may be used as the initiator instead of the combined use of a radical capping agent and a radical generator.

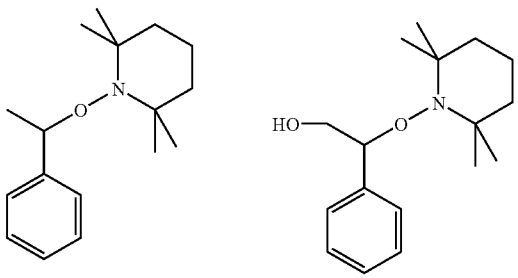

When an alkoxyamine compound is used as the initiator and the compound has a hydroxyl or like functional group, as shown above, a polymer terminated in the functional group polymer is obtained.

The monomer(s) and the polymerization conditions such as solvent and polymerization temperature which are to be used in the polymerization using a radical capping agent such as a nitroxide compound as mentioned above are not restricted but may be the same as those used in atom transfer radical polymerization to be mentioned below.

The technique of atom transfer radical polymerization is more preferred as the technique of living radical polymerization to be used in the invention, is now described.

In this atom transfer radical polymerization, an organic halide, in particular an organic halide having a highly reactive carbon-halogen bond (e.g. a carbonyl compound having a halogen at the α position, or a compound having a halogen at the benzyl position), or a sulfonyl halide compound or the like is preferably used as the initiator.

For obtaining a vinyl polymer having an alkenyl group at both termini by this polymerization method, an organic halide or halogenated sulfonyl compound having two or more initiation sites is used as the initiator. Specific examples thereof are:

o-, m- or p-$XCH_2$—$C_6H_4$—$CH_2X$, o-, m- or p-$CH_3C(H)$(X)—$C_6H_4$—$C(H)(X)CH_3$, o-, m- or p-$(CH_3)_2C(X)$—$C_6H_4$—$C(X)(CH_3)_2$

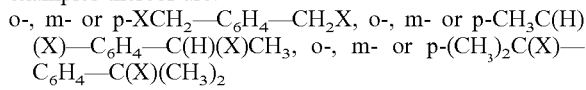

(in the above formulas, $C_6H_4$ denotes a phenylene group and X represents a chlorine, bromine or iodine atom), $RO_2C$—$C(H)(X)$—$(CH_2)_n$—$C(H)(X)$—$CO_2R$, $RO_2C$—$C(CH_3)(X)$—$(CH_2)_n$—$C(CH_3)(X)$—$CO_2R$, $RC(O)$—$C(H)(X)$—$(CH_2)_n$—$C(H)(X)$—$C(O)R$, $RC(O)$—$C(CH_3)(X)$—$(CH_2)_n$—$C(CH_3)(X)$—$C(O)R$ (in the above formulas, R represents a $C_1$–$C_{20}$ alkyl group, aryl group or aralkyl group, n represents an integer of 0 to 20 and X represents a chlorine, bromine or iodine atom), $XCH_2$—$C(O)$—$CH_2X$, $H_3C$—$C(H)(X)$—$C(O)$—$C(H)(X)$—$CH_3$, $(H_3C)_2C(X)$—$C(O)$—$C(X)(CH_3)_2$, $C_6H_5C(H)(X)$—$(CH_2)_n$—$C(H)(X)C_6H_5$ (in the above formulas, X represents a chlorine, bromine or iodine atom and n represents an integer of 0 to 20), $XCH_2CO_2$—$(CH_2)_n$—$OCOCH_2X$, $CH_3C(H)(X)CO_2$—$(CH_2)_n$—$OCOC(H)(X)CH_3$, $(CH_3)_2C(X)CO_2$—$(CH_2)_n$—$OCOC(X)(CH_3)_2$ (in the above formulas, n represents an integer of 1 to 20), $XCH_2C(O)C(O)CH_2X$, $CH_3C(H)(X)C(O)C(O)C(H)(X)CH_3$, $(CH_3)_2C(X)C(O)C(O)C(X)(CH_3)_2$, o-, m- or p-$XCH_2CO_2$—$C_6H_4$—$OCOCH_2X$, o-, m- or p-$CH_3C(H)(X)CO_2$—$C_6H_4$—$OCOC(H)(X)CH_3$, o-, m- or p-$(CH_3)_2C(X)CO_2$—$C_6H_4$—$OCOC(X)(CH_3)_2$, o-, m- or p-$XSO_2$—$C_6H_4$—$SO_2X$ (in the above formulas, X represents a chlorine, bromine or iodine atom).

The transition metal complex to be used as the polymerization catalyst is not particularly restricted but includes, as preferred species, transition metal complexes the central metal of which belongs to the group 7, 8, 9, 10 or 11 of the periodic table of the elements. As more preferred species, there may be mentioned complexes of zero-valence copper, monovalent copper, divalent ruthenium, divalent iron or divalent nickel. Copper complexes are preferred among others. As specific examples of the monovalent copper compound, there may be mentioned cuprous chloride, cuprous bromide, cuprous iodide, cuprous cyanide, cuprous oxide and cuprous perchlorate. When a copper compound is used, a ligand, for example 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl)amine, is added for increasing the catalytic activity. The tristriphenylphosphine complex of divalent ruthenium chloride ($RuCl_2(PPh_3)_3$) is also suited for use as a catalyst. When a ruthenium compound is used as a catalyst, an aluminum alkoxide is added as an activator. Further, the bistriphenylphosphine complex of divalent iron ($FeCl_2(PPh_3)_2$), the bistriphenylphosphine complex of divalent nickel ($NiCl_2(PPh_3)_2$) and the bistributylphosphine complex of divalent nickel ($NiBr_2(PBu_3)_2$) are also suited as catalysts.

The vinyl monomer(s) to be used in this polymerization is (are) not particularly restricted but any of those already mentioned specifically hereinabove can appropriately be used.

The above polymerization reaction can be carried out without using any solvent or in any of various solvents. As the solvents, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and so on. These may be used singly or two or more of them may be used in admixture. It is also possible to carry out the polymerization in an emulsion system or a system in which the supercritical fluid $CO_2$ is used as a medium.

This polymerization can be carried out in the range of 0 to 200° C., preferably within the range of room temperature to 150° C., although such range has no restrictive meaning.

<Alkenyl Group Introduction>

The method of producing the vinyl polymer having an alkenyl group at one or more termini thereof specifically includes, but is not limited to, the methods (A) to (C) mentioned below.

(A) The method comprising directly introducing an alkenyl group into the polymer main chain on the occasion of synthesizing a vinyl polymer by radical polymerization.

(B) The method comprising using a vinyl polymer having at least one halogen atom and substituting an alkenyl-containing functional group for this halogen atom. This halogen group is not restricted but is preferably one represented by the general formula (4):

$$-C(R^5)(R^6)(X) \quad (4)$$

wherein $R^5$ and $R^6$ each represents a group bound to an ethylenically unsaturated group of the vinyl monomer and X represents a chlorine, bromine or iodine atom.

(C) The method comprising using a vinyl polymer having at least one hydroxyl group and substituting an alkenyl-containing functional group for this hydroxyl group.

Referring to the above method of synthesis (A), the method of directly introducing an alkenyl group into the polymer main chain is not particularly restricted but specifically includes, among others, the methods (A-a) and (A-b) mentioned below.

(A-a) The method comprising subjecting a compound having both a polymerizable alkenyl group and a low-polymerizable alkenyl group in each molecule as represented by the general formula (5) shown below to reaction together with a predetermined vinyl monomer(s) on the occasion of synthesizing a vinyl polymer by living radical polymerization:

$$H_2C = C(R^7) - R^8 - R^9 - C(R^7) = CH_2 \quad (5)$$

wherein $R^7$s represent a hydrogen atom or a methyl group and they may be the same or different, $R^8$ represents a —C(O)O— (ester group) or an o-, m- or p-phenylene group, $R^9$ represents a direct bond or a divalent organic group containing 1 to 20 carbon atoms, which may optionally contain one or more ether bonds. When $R^8$ is an ester group, the compound is a (meth)acrylate compound and, when $R^8$ is a phenylene group, the compound is a styrenic compound. As examples of $R^9$ in the above general formula (5) there may be mentioned alkylene groups such as methylene, ethylene and propylene; o-, m- and p-phenylene; aralkyl groups such as benzyl; and ether bond-containing alkylene groups such as —$CH_2CH_2$—O—$CH_2$— and —O—$CH_2$—.

Among the compounds of the general formula (5), the following are preferred because of ready availability:

$H_2C$=$C(H)C(O)O(CH_2)_n$—CH=$CH_2$, $H_2C$=$C(CH_3)C(O)O(CH_2)_n$—CH=$CH_2$ (in the above formulas, n represents an integer of 0 to 20)

$H_2C$=$C(H)C(O)O(CH_2)_n$—O—$(CH_2)_m$CH=$CH_2$,
$H_2C$=$C(CH_3)C(O)O(CH_2)_n$—O—$(CH_2)_m$CH=$CH_2$ (in the above formulas, n represents an integer of 1 to 20 and m represents an integer of 0 to 20), o-, m-, p-divinylbenzene, o-, m-, p-$H_2C$=CH—$C_6H_4$—$CH_2CH$=$CH_2$, o, m, p-$H_2C$=CH—$C_6H_4$—$CH_2$—C$(CH_3)$=$CH_2$, o, m, p-$H_2C$=CH—$C_6H_4$—$CH_2CH_2CH$=$CH_2$, o, m, p-$H_2C$=CH—$C_6H_4$—$OCH_2CH$=$CH_2$, o, m, p-$H_2C$=CH—$C_6H_4$—$OCH_2$—C$(CH_3)$=$CH_2$, o, m, p-$H_2C$=CH—$C_6H_4$—$OCH_2CH_2CH$=$CH_2$, o, m, p-$H_2C$=$C(CH_3)$—$C_6H_4$—$(CH_3)$=$CH_2$, o, m, p-$H_2C$=$C(CH_3)$—$C_6H_4$—$CH_2CH$=$CH_2$, o, m, p-$H_2C$=$C(CH_3)$—$C_6H_4$—$CH_2$C$(CH_3)$=$CH_2$, o, m, p-$H_2C$=$C(CH_3)$—$C_6H_4$—$CH_2CH_2CH$=$CH_2$, o, m, p-$H_2C$=$C(CH_3)$—$C_6H_4$—

OCH$_2$CH=CH$_2$, o, m, p-H$_2$C=C(CH$_3$)—C$_6$H$_4$—OCH$_2$—C(CH$_3$)=CH$_2$, o, m, p-H$_2$C=C(CH$_3$)—C$_6$H$_4$—OCH$_2$CH$_2$CH=CH$_2$ (in the above formulas, C$_6$H$_4$ represents a phenylene group).

The time when the compound having both a polymerizable alkenyl compound and a low-polymerizable alkenyl group is not particularly restricted. Preferably, however, it is subjected to reaction as a second monomer at the final stage of the polymerization or after completion of the reaction involving a predetermined monomer(s) in the living radical polymerization.

(A-b) The method comprising subjecting a compound having at least two low-polymerizable alkenyl groups to reaction as a second monomer at the final stage of the polymerization or after completion of the reaction involving a predetermined monomer(s) in synthesizing a vinyl polymer by living radical polymerization.

Such compound is not particularly restricted but includes, among others, compounds represented by the general formula (6)

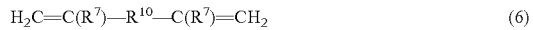

$$H_2C=C(R^7)—R^{10}—C(R^7)=CH_2 \quad (6)$$

wherein R$^7$s represents a hydrogen atom or a methyl group and they may be the same or different, R$^{10}$ represents a divalent organic group containing 1 to 20 carbon atoms, which may optionally contain one or more ether bonds.

The compound represented by the above general formula (6) is not particularly restricted. Preferred are, however, 1,5-hexadiene, 1,7-octadiene and 1,9-decadiene in view of their ready availability.

Among the variations of the above synthetic method (A) for synthesizing a vinyl polymer having an alkenyl group at one or more termini thereof by directly introducing the alkenyl group into the polymer main chain, the method (A-b) is preferred since the alkenyl groups introduced per molecule can be controlled more easily.

The above method (B) for synthesizing a vinyl polymer having, at one or more termini thereof, a halogen atom, preferably halogen atom represented by the general formula (4) is preferably carried out in the manner of atom transfer living polymerization. The method of substituting an alkenyl-containing functional group for the halogen atom of that polymer is not particularly restricted but specifically includes, among others, the methods (B-a) to (B-d) mentioned below.

(B-a) The method comprising reacting a vinyl polymer having, at one or more termini thereof, a halogen atom, preferably a halogen atom represented by the general formula (4), with one of various alkenyl-containing organometallic compounds to thereby substitute for the halogen.

As such organometallic compounds, there may be mentioned organolithium, organosodium, organopotassium, organomagnesium, organotin, organosilicon, organozinc, organocopper and like compounds. In particular, roganotin and organocopper compounds are preferred since they react selectively with the halogen represented by the general formula (4) and are low in reactivity with a carbonyl group.

The alkenyl-containing organotin compound is not particularly restricted but compounds represented by the general formula (7):

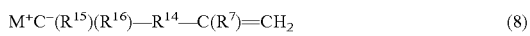

$$H_2C=C(R^7)C(R^{11})(R^{12})Sn(R^{13})_3 \quad (7)$$

wherein R$^7$ is as defined above, R$^{11}$ and R$^{12}$ each represents a hydrogen, an alkyl group containing 1 to 10 carbon atoms, an aryl group containing 6 to 10 carbon atoms or an aralkyl group containing 7 to 10 carbon atoms and they may be the same or different, R$^{13}$ represents a C$_1$–C$_{10}$ alkyl group, aryl group or aralkyl group. As specific examples of the organotin compound of the general formula (7), there may be mentioned allyltributyltin, allyltrimethyltin, allyltri(n-octyl)tin and allyltri(cyclohexyl)tin.

As the alkenyl-containing copper compound, there may be mentioned divinylcopper-lithium, diallylcopper-lithium and diisopropenylcopper-lithium.

(B-b) The method comprising reacting a vinyl polymer having, at one or more termini thereof, a halogen atom, preferably a halogen represented by the general formula (4), with a stabilized alkenyl-containing carbanion represented by the general formula (8), for instance, to thereby substitute for the halogen:

$$M^+C^-(R^{15})(R^{16})—R^{14}—C(R^7)=CH_2 \quad (8)$$

wherein R$^7$ is as defined above, M$^+$ represents an alkali metal ion or a quaternary ammonium ion, R$^{14}$ represents a divalent organic group containing 1 to 20 carbon atoms, which may optionally contain one or more ether bonds, and R$^{15}$ and R$^{16}$ each represents an electron-attracting group stabilizing the carbanion C— or one of them represents such an electron-attracting group and the other represents a hydrogen atom, an alkyl group containing 1 to 10 carbon atoms or a phenyl group. As the electron-attracting group R$^{15}$ and/or R$^{16}$, there may be mentioned —CO$_2$R (ester group), —C(O)R (keto group), —CON(R$_2$) (amide group), —COSR (thioester group), —CN (nitrile group) and —NO$_2$ (nitro group), among others. The substituent R is an alkyl group containing 1 to 20 carbon atoms, an aryl group containing 6 to 20 carbon atoms or an aralkyl group containing 7 to 20 carbon atoms and preferably is an alkyl group containing 1 to 10 carbon atoms or a phenyl group. Particularly preferred as R$^{15}$ and R$^{16}$ are —CO$_2$R, —C(O)R and —CN.

As specific examples of the alkali metal ion, there may be mentioned the lithium ion, sodium ion and potassium ion and, as the quaternary ammonium ion, there may be mentioned the tetramethylammonium ion, tetraethylammonium ion, trimethylbenzylammonium ion, trimethyldodecylammonium ion and tetrabutylammonium ion.

The carbanion of the general formula (8) can be obtained by reacting a precursor thereof with a basic compound to thereby withdraw the active proton.

As examples of the precursor of the carbanion of the general formula (8), there may be mentioned the following compounds:

H$_2$C=CH—CH(CO$_2$CH$_3$)$_2$, H$_2$C=CH—CH(CO$_2$C$_2$H$_5$)$_2$, H$_2$C=CH—(CH$_2$)$_n$CH(CO$_2$CH$_3$)$_2$, H$_2$C=CH—(CH$_2$)$_n$CH(CO$_2$C$_2$H$_5$)$_2$, o-, m-, p-H$_2$C=CH—C$_6$H$_4$—CH(CO$_2$CH$_3$)$_2$, o-, m-, p-H$_2$C=CH—C$_6$H$_4$—CH(CO$_2$C$_2$H$_5$)$_2$, o-, m-, p-H$_2$C=CH—C$_6$H$_4$—CH$_2$CH(CO$_2$CH$_3$)$_2$, o-, m-, p-H$_2$C=CH—C$_6$H$_4$—CH$_2$CH(CO$_2$C$_2$H$_5$)$_2$, H$_2$C=CH—CH(C(O)CH$_3$)(CO$_2$C$_2$H$_5$), H$_2$C=CH—(CH$_2$)$_n$CH(C(O)CH$_3$)(CO$_2$C$_2$H$_5$), o-, m-, p-H$_2$C=CH—C$_6$H$_4$—CH(C(O)CH$_3$)(CO$_2$C$_2$H$_5$), o-, m-, p-H$_2$C=CH—C$_6$H$_4$—CH$_2$CH(C(O)CH$_3$)(CO$_2$C$_2$H$_5$), H$_2$C=CH—CH(C(O)CH$_3$)$_2$, H$_2$C=CH—(CH$_2$)$_n$CH(C(O)CH$_3$)$_2$, o-, m-, p-H$_2$C=CH—C$_6$H$_4$—CH(C(O)CH$_3$)$_2$, o-, m-, p-H$_2$C=CH—C$_6$H$_4$—CH$_2$CH(C(O)CH$_3$)$_2$, H$_2$C=CH—CH(CN)(CO$_2$C$_2$H$_5$), H$_2$C=CH—(CH$_2$)$_n$CH(CN)(CO$_2$C$_2$H$_5$), o-, m-, p-H$_2$C=CH—C$_6$H$_4$—CH(CN)(CO$_2$C$_2$H$_5$), o-, m-, p-H$_2$C=CH—C$_6$H$_4$—CH$_2$CH(CN)(CO$_2$C$_2$H$_5$), H$_2$C=CH—CH(CN)$_2$, H$_2$C=CH—

(CH$_2$)$_n$CH(CN)$_2$, o-, m-, p-H$_2$C=CH—C$_6$H$_4$—CH(CN)$_2$, o-, m-, p-H$_2$C=CH—C$_6$H$_4$—CH$_2$CH(CN)$_2$, H$_2$C=CH—(CH$_2$)$_n$NO$_2$, o-, m-, p-H$_2$C=CH—C$_6$H$_4$—CH$_2$NO$_2$, o-, m-, p-H$_2$C=CH—C$_6$H$_4$—CH$_2$CH$_2$NO$_2$, H$_2$C=CH—CH(C$_6$H$_5$)(CO$_2$C$_2$H$_5$), H$_2$C=CH—(CH$_2$)$_n$CH(C$_6$H$_5$)(CO$_2$C$_2$H$_5$), o-, m-, p-H$_2$C=CH—C$_6$H$_4$—CH(C$_6$H$_5$)(CO$_2$C$_2$H$_5$), o-, m-, p-H$_2$C=CH—C$_6$H$_4$—CH$_2$CH(C$_6$H$_5$)(CO$_2$C$_2$H$_5$)

(in the above formulas, n represents an integer of 1 to 10).

For withdrawing a proton from the above compound to give the carbanion of the general formula (8), one of various basic compounds are used. As such basic compounds, there may be mentioned the following:

Alkali metals such as sodium, potassium and lithium; metal alkoxides such as sodium methoxide, potassium methoxide, lithium methoxide, sodium ethoxide, potassium ethoxide, lithium ethoxide, sodium tert-butoxide and potassium tert-butoxide; carbonates such as sodium carbonate, potassium carbonate, lithium carbonate and sodium hydrogen carbonate; hydroxides such as sodium hydroxide and potassium hydroxide; hydrides such as sodium hydride, potassium hydride, methyllithium and ethyllithium; organometals such as n-butyllithium, tert-butyllithium, lithium diisopropylamide and lithium hexamethyldisilazide; ammonia; alkylamines such as trimethylamine, triethylamine and tributylamine; polyamines such as tetramethylethylenediamine and pentamethyl-diethylenetriamine; pyridine compounds such as pyridine and picoline, etc.

The basic compound is used in an equivalent amount or in a slight excess relative to the precursor substance, preferably in an amount of 1 to 1.2 equivalents.

A quaternary ammonium salt may also be used as the above carbanion. In this case, it can be obtained by preparing an alkali metal salt of a carboxylic acid compound and reacting this with a quaternary ammonium halide. As examples of the quaternary ammonium halide, there may be mentioned tetramethylammonium halides, tetraethylammonium halides, trimethylbenzylammonium halides, trimethyldodecylammonium halides and tetrabutylammonium halides.

As the solvent to be used in reacting the above precursor with a basic compound, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; amide solvents such as dimethylformamide and dimethylacetamide; sulfoxide solvents such as dimethyl sulfoxide; and so on. These may be used singly or two or more of them may be used in admixture.

By reacting the above precursor with a basic compound, a carbanion represented by the general formula (8) is prepared and, by reacting the same with a vinyl polymer having a terminal halogen, preferably a terminal halogen represented by the general formula (4), the desired alkenyl-terminated vinyl polymer can be obtained.

(B-c) The method comprising reacting a vinyl polymer having, at one or more termini thereof, a halogen atom, preferably a halogen atom represented by the general formula (4), with a simple substance metal or an organometallic compound and then reacting the thus-formed enolate anion with an alkenyl-containing electrophilic compound.

Particularly preferred as the simple substance metal is zinc, since the resulting enolate anion will not attack other ester groups or hardly undergo such side reactions as rearrangement. Various species can be used as the alkenyl-containing electrophilic compound, for example alkenyl-containing compounds having a leaving group such as a halogen and an acetyl group, alkenyl-containing carbonyl compounds, alkenyl-containing isocyanate compounds and alkenyl-containing acid halides. Among these, alkenyl-containing compounds having a leaving group such as a halogen atom and an acetyl group are preferred since when they are used, no other atoms than carbon atoms are introduced into the main chain, hence the vinyl polymer will not lose its weathering resistance.

(B-d) The method comprising reacting a vinyl polymer having, at one or more termini thereof, a halogen atom, preferably a halogen atom represented by the general formula (4), with an alkenyl-containing oxyanion represented by the general formula (9) given below or an alkenyl-containing carboxylate anion represented by the general formula (10) given below to thereby substitute the alkenyl group for the halogen atom:

$$CH_2=C(R^7)-R^{14}-O^-M^+ \quad (9)$$

wherein $R^7$, $R^{14}$ and $M^+$ are as defined above;

$$CH_2=C(R^7)-R^{14}-C(O)O^-M^+ \quad (10)$$

wherein $R^7$, $R^{14}$ and $M^+$ are as defined above.

As the precursor of the oxyanion represented by the general formula (9) or (10), there may be mentioned the following compounds:

Alcoholic hydroxyl-containing compounds such as H$_2$C=CH—CH$_2$—OH, H$_2$C=CH—CH(CH$_3$)—OH, H$_2$C=C(CH$_3$)—CH$_2$—OH, H$_2$C=CH—(CH$_2$)$_n$—OH (n being an integer of 2 to 20), H$_2$C=CH—CH$_2$—O—(CH$_2$)$_2$—OH, H$_2$C=CH—C(O)O—(CH$_2$)$_2$—OH, H$_2$C=C(CH$_3$)—C(O)O—(CH$_2$)$_2$—OH, o-, m-, p-H$_2$C=CH—C$_6$H$_4$—CH$_2$—OH, o-, m-, p-H$_2$C=CH—CH$_2$—C$_6$H$_4$—CH$_2$—OH, o-, m-, p-H$_2$C=CH—CH$_2$—O—C$_6$H$_4$—OH; phenolic hydroxyl-containing compounds such as o-, m-, p-H$_2$C=CH—C$_6$H$_4$—OH, o-, m-, p-H$_2$C=CH—CH$_2$—C$_6$H$_4$—OH, o-, m-, p-H$_2$C=CH—CH$_2$—O—C$_6$H$_4$—OH; carboxyl-containing compounds such as H$_2$C=CH—C(O)—OH, H$_2$C=C(CH$_3$)—C(O)—OH, H$_2$C=CH—CH$_2$—C(O)—OH, H$_2$C=CH—(CH$_2$)$_n$C(O)—OH (n being an integer of 2 to 20), H$_2$C=CH—(CH$_2$)$_n$—OC(O)—(CH$_2$)$_m$—C(O)—OH (m and n being the same or different and each being an integer of 0 to 19), o-, m-, p-H$_2$C=CH—C$_6$H$_4$—C(O)—OH, o-, m-, p-H$_2$C=CH—CH$_2$—C$_6$H$_4$—C(O)—OH, o-, m-, p-H$_2$C=CH—CH$_2$—O—C$_6$H$_4$—C(O)—OH, o-, m-, p-H$_2$C=CH—(CH$_2$)$_n$—OC(O)—C$_6$H$_4$—C(O)—OH (n being an integer of 0 to 13); and the like.

For withdrawing a proton from the above compound to give an anion of the general formula (9) or (10), various basic compounds can be used. As specific examples thereof, those basic compounds which are mentioned hereinabove for use in preparing the carbanion of the general formula (8) are all suited for use. As for the reaction solvent, all the solvents usable in preparing the carbanion can appropriately be used.

Among the synthetic method (B), the method (B-d) is preferred since the alkenyl group introduction can be realized at a high rate. Thus, a vinyl polymer having, at one or more termini thereof, a halogen atom, preferably a halogen atom represented by the general formula (4), as obtained by atom transfer radical polymerization using an organic halide or halogenated sulfonyl compound as an initiator and a transition metal complex as a catalyst is subjected to halogen conversion by the method (B-d). Among the method (B-d), the method comprising reacting an alkenyl-containing carboxylate anion represented by the general formula (10) or the like is more preferred.

When, in the process for producing a vinyl polymer which is characterized by using the atom transfer radical polymerization technique for polymerizing a vinyl monomer(s) with an organic halide or halogenated sulfonyl compound as an initiator and a transition metal complex as a catalyst, an alkenyl-containing organic halide is used as the initiator, a vinyl polymer terminated in the alkenyl group at one terminus and in the halogen atom, preferably in a structure of the general formula (4), at the other terminus can be obtained. When the halogen in a termination terminus of the thus-obtained polymer is converted to an alkenyl-containing substituent, a vinyl polymer having the respective alkenyl groups at the respective termini can be obtained. As the method of conversion, the methods already described hereinabove can be used.

The alkenyl-containing organic halide is not particularly restricted but includes, among others, compounds having the structure represented by the general formula (11):

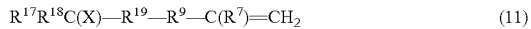

$$R^{17}R^{18}C(X)-R^{19}-R^9-C(R^7)=CH_2 \quad (11)$$

wherein $R^7$, $R^9$ and X are as defined above, $R^{17}$ and $R^{18}$ each represents a hydrogen atom, an alkyl group containing 1 to 20 carbon atoms, an aryl group containing 6 to 20 carbon atoms or an aralkyl group containing 7 to 20 carbon atoms or both are linked together at the respective other termini and $R^{19}$ represents —C(O)O— (ester group), —C(O)— (keto group) or an o-, m- or p-phenylene group.

As specific examples of the alkenyl-containing organic halide represented by the general formula (11), there may be mentioned the following:
$XCH_2C(O)O(CH_2)_nCH=CH_2$, $H_3CC(H)(X)C(O)O(CH_2)_nCH=CH_2$, $(H_3C)_2C(X)C(O)O(CH_2)_nCH=CH_2$, $CH_3CH_2C(H)(X)C(O)O(CH_2)_nCH=CH_2$,

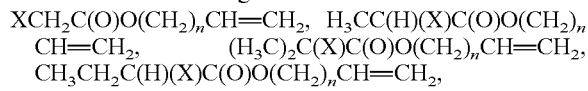

(in the above formulas, X represents a chlorine, bromine or iodine atom and n represents an integer of 0 to 20),
$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

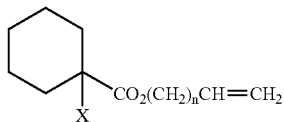

(in the above formulas, X represents a chlorine, bromine or iodine atom, n represents an integer of 1 to 20 and m represents an integer of 0 to 20),
o-, m-, p-$XCH_2$—$C_6H_4$—$(CH_2)_n$—CH=$CH_2$, o-, m-, p-$CH_3C(H)(X)$—$C_6H_4$—$(CH_2)_n$—CH=$CH_2$, o-, m-, p-$CH_3CH_2C(H)(X)$—$C_6H_4$—$(CH_2)_n$—CH=$CH_2$ (in the above formulas, X represents a chlorine, bromine or iodine atom and n represents an integer of 0 to 20),
o-, m-, p-$XCH_2$—$C_6H_4$—$(CH_2)_n$—O—$(CH_2)_m$—CH=$CH_2$, o-, m-, p-$CH_3C(H)(X)$—$C_6H_4$—$(CH_2)_n$—O—$(CH_2)$—CH=$CH_2$, o-, m-, p-$CH_3CH_2C(H)(X)$—$C_6H_4$—$(CH_2)_n$—O—$(CH_2)_m$—CH=$CH_2$ (in the above formulas, X represents a chlorine, bromine or iodine atom, n represents an integer of 1 to 20 and m represents an integer of 0 to 20),
o-, m-, p-$XCH_2$—$C_6H_4$—O—$(CH_2)_n$—CH=$CH_2$, o-, m-, p-$CH_3C(H)(X)$—$C_6H_4$—O—$(CH_2)_n$—CH=$CH_2$, o-, m-, p-$CH_3CH_2C(H)(X)$—$C_6H_4$—O—$(CH_2)_n$—CH=$CH_2$ (in the above formulas, X represents a chlorine, bromine or iodine atom and n represents an integer of 0 to 20),
o-, m-, p-$XCH_2$—$C_6H_4$—O—$(CH_2)_n$—O—$(CH_2)_m$—CH=$CH_2$, o-, m-, p-$CH_3C(H)(X)$—$C_6H_4$—O—$(CH_2)_n$—O—$(CH_2)_m$—CH=$CH_2$, o-, m-, p-$CH_3CH_2C(H)(X)$—$C_6H_4$—O—$(CH_2)_n$—O—$(CH_2)_m$—CH=$CH_2$ (in the above formulas, X represents a chlorine, bromine or iodine atom, n represents an integer of 1 to 20 and m represents an integer of 0 to 20).

As the alkenyl-containing organic halide, there may further be mentioned compounds represented by the general formula (12):

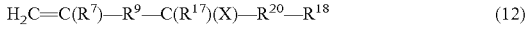

$$H_2C=C(R^7)-R^9-C(R^{17})(X)-R^{20}-R^{18} \quad (12)$$

wherein $R^7$, $R^9$, $R^{17}$, $R^{18}$ and X are as defined above and $R^{20}$ represents a direct bond, —C(O)O— (ester group), —C(O)— (keto group) or an o-, m- or p-phenylene group.

$R^9$ is a direct bond or a divalent organic group containing 1 to 20 carbon atoms (which may contain one or more ether bonds) and, when it is a direct bond, the vinyl group is bound to the carbon to which the halogen is bound, giving an allyl halide compound. In this case, the carbon-halogen bond is activated by the neighboring vinyl group and, therefore, $R^{20}$ is not always required to be a C(O)O group, a phenylene group or the like but may be a direct bond. In cases where $R^9$ is not a direct bond, $R^{17}$ is preferably a C(O)O, C(O) or phenylene group so that the carbon-halogen bond can be activated.

The compound of the above general formula (12) specifically includes, among others, the following compounds:
$CH_2$=CHCH$_2$X, $CH_2$=C(CH$_3$)CH$_2$X, $CH_2$=CHC(H)(X)CH$_3$, $CH_2$=C(CH$_3$)C(H)(X)CH$_3$, $CH_2$=CHC(X)(CH$_3$)$_2$, $CH_2$=CHC(H)(X)C$_2$H$_5$, $CH_2$=CHC(H)(X)CH(CH$_3$)$_2$, $CH_2$=CHC(H)(X)C$_6$H$_5$, $CH_2$=CHC(H)(X)CH$_2$C$_6$H$_5$, $CH_2$=CHCH$_2$C(H)(X)—CO$_2$R, $CH_2$=CH(CH$_2$)$_2$C(H)(X)—CO$_2$R, $CH_2$=CH(CH$_2$)$_3$C(H)(X)—CO$_2$R, $CH_2$=CH(CH$_2$)$_8$C(H)(X)—CO$_2$R, $CH_2$=CHCH$_2$C(H)(X)—C$_6$H$_5$, $CH_2$=CH(CH$_2$)$_2$C(H)(X)—C$_6$H$_5$, $CH_2$=CH(CH$_2$)$_3$C(H)(X)—C$_6$H$_5$ (in the above formulas, X represents a chlorine, bromine or iodine atom and R represents a $C_1$–$C_{20}$ alkyl group, aryl group or aralkyl group).

The alkenyl-containing halogenated sulfonyl compound specifically includes, among others, the following compounds:

o-, m-, p-CH$_2$=CH—(CH$_2$)$_n$—C$_6$H$_4$—SO$_2$X, o-, m-, p-CH$_2$=CH—(CH$_2$)$_n$—O—C$_6$H$_4$—SO$_2$X (in the above formulas, X represents a chlorine, bromine or iodine atom and n represents an integer of 0 to 20).

When an alkenyl-containing organic halide or halogenated sulfonyl compound or the like is used as the initiator, a polymer having the alkenyl group at one terminus and a halogen group, preferably a halogen represented by the general formula (4), at the other terminus can be obtained. By coupling the terminal halogen in one of this polymer with the terminal halogen in another using a compound having a total of at least two functional groups which are the same or different and can substitute for the halogen atom of the polymer, it is also possible to obtain a vinyl polymer having an alkenyl group at both termini.

The compound having a total of at least two functional groups which are the same or different and can substitute for the terminal halogen atom is not particularly restricted but preferably includes polyols, polyamines, polycarboxylic acids, polythiols, and salts thereof, and alkali metal sulfides, among others. Specific examples of these compounds are as follows:

Polyols such as ethylene glycol, 1,2-propanediol, 1,3-propanediol, 2-methyl-1,3-propanediol, 2,2-dimethyl-1,3-propanediol, 1,4-butanediol, 1,3-butanediol, 1,2-butanediol, 2,3-butanediol, pinacol, 1,5-pentanediol, 1,4-pentanediol, 2,4-pentanediol, 1,6-hexanediol, 1,7-heptanediol, 1,8-octanediol, 1,9-nonanediol, 1,10-decanediol, 1,12-dodecanediol, 1,2-cyclopentanediol, 1,3-cyclopentanediol, 1,2-cyclohexanediol, 1,3-cyclohexanediol, 1,4-cyclohexanediol, glycerol, 1,2,4-butanetriol, catechol, resorcinol, hydroquinone, 1,2-dihydroxynaphthalene, 1,3-dihydroxynaphthalene, 1,5-dihydroxynaphthalene, 2,6-dihydroxynaphthalene, 2,2'-biphenol, 4,4'-biphenol, bis(4-hydroxyphenyl)methane, 4,4'-isopropylidenephenol, 3,3'-(ethylenedioxy)diphenol, α,α'-dihydroxy-p-xylene, 1,1,1-tris(4-hydroxyphenyl)ethane, pyrogallol and 1,2,4-benzenetriol; and alkali metal salts of the polyol compounds mentioned above;

Polyamines such as ethylenediamine, 1,3-diaminopropane, 1,2-diaminopropane, 1,4-diaminobutane, 1,2-diamino-2-methylpropane, 1,5-diaminopentane, 2,2-dimethyl-1,3-propanediamine, 1,6-hexanediamine, 1,7-heptanediamine, 1,8-octanediamine, 1,9-diaminononane, 1,10-diaminodecane, 1,12-diaminododecane, 4,4'-methylenebis(cyclohexylamine), 1,2-diaminocyclohexane, 1,3-diaminocyclohexane, 1,4-diaminocyclohexane, 1,2-phenylenediamine, 1,3-phenylenediamine, 1,4-phenylenediamine and α,α'-diamino-p-xylene; and alkali metal salts of the polyamine compounds mentioned above;

Polycarboxylic acids such as oxalic acid, malonic acid, methylmalonic acid, dimethylmalonic acid, succinic acid, methylsuccinic acid, glutaric acid, adipic acid, 1,7-heptanedicarboxylic acid, 1,8-octanedicarboxylic acid, 1,9-nonanedicarboxylic acid, 1,10-decanedicarboxylic acid, 1,11-undecanedicarboxylic acid, 1,12-dodecanedicarboxylic acid, 1,2-cyclopentanedicarboxylic acid, 1,2-cyclohexanedicarboxylic acid, 1,3-cyclohexanedicarboxylic acid, 1,4-cyclohexanedicarboxylic acid, 1,3,5-cyclohexanetricarboxylic acid, phthalic acid, isophthalic acid, terephthalic acid, 1,2,3-benzenetricarboxylic acid and 1,2,4,5-benzenetetracarboxylic acid; and alkali metal salts of the polycarboxylic acids mentioned above;

Polythiols such as 1,2-ethanedithiol, 1,3-propanedithiol, 1,4-butanedithiol, 2,3-butanedithiol, 1,5-pentanedithiol, 1,6-hexanedithiol, 1,7-heptanedithiol, 1,8-octanedithiol, 1,9-nonanedithiol, 2-mercaptoethyl ether, p-xylene-α,α'-dithiol, 1,2-benzenedithiol, 1,3-benzenedithiol and 1,4-benzenedithiol; and alkali metal salts of the polythiol compounds mentioned above;

Lithium sulfide, sodium sulfide and potassium sulfide.

When the above polyols, polyamines, polycarboxylic acids or polythiols are used, a basic compound is combinedly used for promoting the substitution reaction and, as specific examples, there may be mentioned those already mentioned hereinabove.

The synthetic method (C) mentioned above which comprises using a vinyl polymer having at least one hydroxyl group and substituting an alkenyl-containing functional group for this hydroxyl group is not particularly restricted but specifically includes, among others, the methods (C-a) to (C-d) mentioned below. The vinyl polymer having at least one hydroxyl group can be obtained by the methods (D-a) to (D-i) mentioned later herein.

(C-a) The method comprising reacting a vinyl polymer having at least one hydroxyl group with abase, such as sodium hydroxide and sodium methoxide, followed by reacting with an alkenyl-containing halide, such as allyl chloride.

(C-b) The method comprising reacting a vinyl polymer having at least one hydroxyl group with an alkenyl-containing isocyanate compound, such as allyl isocyanate.

(C-c) The method comprising reacting a vinyl polymer having at least one hydroxyl group with an alkenyl-containing acid halide, such as (meth)acrylic acid chloride, in the presence of a base, such as pyridine.

(C-d) The method comprising reacting a vinyl polymer having at least one hydroxyl group with an alkenyl-containing carboxylic acid, such as acrylic acid, in the presence of an acid catalyst.

The method of producing the vinyl polymer having at least one hydroxyl group which is to be used according to method (C) includes, but is not limited to, the methods (D-a) to (D-f) mentioned below.

(D-a) The method comprising subjecting a compound having both a polymerizable alkenyl group and a hydroxyl group in each molecule as represented by the general formula (13) shown below to reaction as a second monomer in synthesizing the vinyl polymer by living radical polymerization:

$$H_2C=C(R^7)-R^8-R^9-OH \qquad (13)$$

wherein $R^7$, $R^8$ and $R^9$ are as defined above.

The time when the compound having both a polymerizable alkenyl group and a hydroxyl group in each molecule is not particularly restricted but, when rubber-like properties are expected, the compound is subjected to reaction as a second monomer preferably at the final stage of the polymerization reaction or after completion of the reaction of a predetermined monomer.

(D-d) The method comprising subjecting a compound having a low-polymerizable alkenyl group and a hydroxyl group in each molecule to reaction as a second monomer at the final stage of the polymerization reaction or after completion of the reaction of a predetermined monomer in synthesizing the vinyl polymer by living radical polymerization. Such compound is not particularly restricted but includes, among others, compounds represented by the general formula (14):

$$H_2C=C(R^7)-R^{10}-OH \qquad (14)$$

wherein $R^7$ and $R^{10}$ are as defined above. The compound represented by the above general formula (14) is not particularly restricted but alkenyl alcohols such as 10-undecenol, 5-hexenol and allyl alcohol are preferred from the viewpoint of ready availability.

(D-c) The method as disclosed in Japanese Kokai Publication Hei-04-132706, for instance, which comprises terminally introducing a hydroxyl group by hydrolyzing the halogen of a vinyl polymer having at least one carbon-halogen bond represented by the general formula (4) as obtained by atom transfer radical polymerization or reacting the same with a hydroxyl-containing compound.

(D-d) The method comprising reacting a vinyl polymer having at least one carbon-halogen bond represented by the general formula (4) as obtained by atom transfer radical polymerization with a stabilized, hydroxyl-containing carbanion such as one represented by the general formula (15) to thereby effect substitution for the halogen:

$$M^+C^-(R^{15})(R^{16})\text{—}R^{14}\text{—}OH \quad (15)$$

wherein $R^{14}$, $R^{15}$ and $R^{16}$ are as defined above.

(D-e) The method comprising reacting a vinyl polymer having at least one carbon-halogen bond represented by the general formula (4) as obtained by atom transfer radical polymerization with a simple substance metal, such as zinc, or an organometallic compound and then reacting the thus-prepared enolate anion with an aldehyde or ketone.

(D-f) The method comprising reacting a vinyl polymer having at least one terminal halogen, preferably a terminal halogen represented by the general formula (4), with a hydroxyl-containing oxyanion represented by the general formula (16) shown below or the like or a hydroxyl-containing carboxylate anion represented by the general formula (17) shown below or the like to thereby substitute a hydroxyl-containing group for the halogen:

$$HO\text{—}R^{14}\text{—}O^-M^+ \quad (16)$$

wherein $R^{14}$ and $M^+$ are as defined above;

$$HO\text{—}R^{14}\text{—}C(O)O^-M^+ \quad (17)$$

wherein $R^{14}$ and $M^+$ are as defined above.

In the practice of the invention, when any halogen is not directly involved in introducing a hydroxyl group, as in the methods (D-a) and (D-b), the method (D-b) is more preferred since the control is easier. In cases where the hydroxyl group introduction is effected by converting the halogen of a vinyl polymer having at least one carbon-halogen bond, as in the methods (D-c) to (D-f), the method (D-f) is more preferred since the control is easier.

<Hydrosilylation Reaction>

By subjecting the alkenyl-terminated vinyl polymer produced in the above manner to hydrosilylation reaction using a silicon compound having both a silicon atom-bound hydrolyzable group and a hydrosilyl group, the silicon atom-bound hydrolyzable group can be introduced terminally into the polymer.

The silicon compound having both a silicon atom-bound hydrolyzable group and a hydrosilyl group is not particularly restricted but includes compounds represented by the general formula (18):

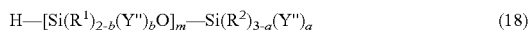

$$H\text{—}[Si(R^1)_{2-b}(Y'')_bO]_m\text{—}Si(R^2)_{3-a}(Y'')_a \quad (18)$$

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by (R')$_3$SiO— (in which R' is a hydrocarbon group containing 1 to 20 carbon atoms and the three R' groups may be the same or different) and, when there are two or more $R^1$ or $R^2$ groups, they may be the same or different, Y'' represents a hydrolyzable group other than a hydroxyl group, a represents 0, 1, 2 or 3, b represents 0, 1 or 2 and m is an integer of 0 to 19 provided that the relation a+mb≧1 should be satisfied. Among them, those in which m is 0 are preferred.

Y'' is not particularly restricted but includes, among others, ketoximo, acyloxy, alkoxy, amido, aminoxy, amino, alkenoxy and halogen groups and a hydrogen atom. Among them, halogen groups are preferred.

As more specific examples of such silicon compound, there may be mentioned dialkylchlorosilanes, in particular chlorodimethylsilane.

The amount of the silicon compound having both a silicon atom-bound hydrolyzable group and a hydrosilyl group which is to be reacted with the alkenyl-terminated polymer is not particularly restricted but, when a compound having only one hydrosilyl group is used, the amount thereof may be equivalent relative to the alkenyl group. When a compound having a plurality of hydrosilyl groups is used, there is the possibility of coupling thereof by the hydrosilylation reaction and, therefore, the compound is preferably used in excess.

For causing the hydrosilylation reaction to proceed rapidly, a hydrosilylation catalyst is added. As such hydrosilylation catalyst, there may be mentioned a radical initiator such as an organic peroxide and an azo compound, and a transition metal catalyst.

The radical initiator is not particularly restricted but may be any of various compounds. As examples, there may be mentioned dialkyl peroxides such as di-tert-butyl peroxide, 2,5-dimethyl-2,5-di(tert-butylperoxy)hexane, 2,5-dimethyl-2,5-di(tert-butylperoxy)-3-hexyne, dicumyl peroxide, tert-butylcumyl peroxide and α,α'-bis(tert-butyl-peroxy)isopropylbenzene, diacyl peroxides such as benzoyl peroxide, p-chlorobenzoyl peroxide, m-chlorobenzoyl peroxide, 2,4-dichlorobenzoyl peroxide and lauroyl peroxide, peresters such as tert-butyl perbenzoate, peroxydicarbonates such as diisopropyl peroxydicarbonate and di-2-ethylhexyl peroxydicarbonate, and peroxyketals such as 1,1-di(tert-butylperoxy)cyclohexane and 1,1-di(tert-butylperoxy)-3,3,5-trimethylcyclohexane, among others.

As the transition metal catalyst, there may be mentioned, for example, simple substance platinum, solid platinum dispersed on a support such as alumina, silica or carbon black, chloroplatinic acid, complexes of chloroplatinic acid with alcohols, aldehydes, ketones and the like, platinum-olefin complexes and platinum(O)-divinyltetramethyldisiloxane complex. As examples of the catalyst other than platinum compounds, there may be mentioned RhCl(PPh$_3$)$_3$, RhCl$_3$, RuCl$_3$, IrCl$_3$, FeCl$_3$, AlCl$_3$, PdCl$_2$.H$_2$O, NiCl$_2$, TiCl$_4$, etc.

These catalyst may be used singly or two or more of them may be used combinedly.

The amount of the catalyst is not particularly restricted but recommendably is within the range of $10^{-1}$ to $10^{-8}$ mole, preferably within the range of $10^{-3}$ to $10^{-6}$ mole, per mole of the alkenyl group of the polymer. When it is less than $10^{-8}$ mole, the curing may not proceed to a sufficient extent. Since the hydrosilylation catalyst is expensive, it is recommendable that it be not used in an amount exceeding $10^{-1}$ mole.

The hydrosilylation reaction may be conducted without using any solvent or in the presence of a solvent. Ordinary organic solvents, such as hydrocarbon solvents, ether solvents and ester solvents, can be used as the solvent. However, those capable of coordinating with transition metals, for example amines and phosphines may possibly lower the catalytic activity, hence are undesirable, when a transition metal catalyst is used.

The hydrosilylation reaction temperature is not particularly restricted but the reaction is generally carried out at 0 to 250° C., preferably 20 to 150° C., most preferably 40 to 120° C.

<Hydrolysis Reaction>

The silicon atom-bound hydrolyzable group at a terminus of the polymer produced in the above manner can be converted to a silanol group by hydrolysis.

When the hydrolyzable group is a hydrogen atom, the hydrolysis can be effected by a method known in the art, which is not restricted, for example by reacting with a buffer solution in the presence of a Pd/C catalyst (J. Org. Chem., 31, 885 (1966)) or by reacting a buffer solution in the presence of a platinum catalyst.

When the hydrolyzable group is a halogen atom, in particular a chlorine atom, the hydrolysis is generally carried out at 0 to 60° C., preferably in the presence of a base, such as sodium bicarbonate, which is used for neutralizing the byproduct hydrochloric acid, although the conditions are not limited to those mentioned above.

<<Curable Composition>>

The vinyl polymer (I) having a silanol group at one or more termini thereof according to the first aspect of the invention can be used in a curable composition utilizing the condensation reaction of the silanol group.

When there are two or more silanol groups in each polymer, the polymer can by itself undergo condensation crosslinking. Even in such case, and in particular in other cases, it is preferred, but is not always necessary, that the composition contain a silicon compound having two or more silicon atom-bound hydrolyzable groups or a polymer having a silicon atom-bound hydrolyzable group(s) (other than a hydroxyl group).

The silicon compound having two or more silicon atom-bound hydrolyzable groups is not particularly restricted but includes compounds represented by the general formula (2):

$$Z-[Si(R^3)_{2-b}(Y')_b O]_m-Si(R^4)_{3-a}(Y')_a \quad (2)$$

wherein $R^3$ and $R^4$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' is a monovalent hydrocarbon group containing 1 to 20 carbon atoms and the three R' groups may be the same or different) and, when there are two or more $R^3$ or $R^4$ groups, they may be the same or different, Y' represents a hydrolyzable group other than a hydroxyl group, Z represents an alkyl group containing 1 to 20 carbon atoms, an aryl group containing 6 to 20 carbon atoms, an aralkyl group containing 7 to 20 carbon atoms, a triorganosiloxy group represented by $(R')_3SiO-$ (in which R' is as defined above) or a hydrolyzable group other than a hydroxyl group, a represents 0, 1, 2 or 3, b represents 0, 1 or 2 and m is an integer of 0 to 19 provided that when Z is a hydrolyzable group, the relation $a+mb \geq 1$ should be satisfied and, when Z is other than a hydrolyzable group, the relation $a+mb \geq 2$ should be satisfied.

Referring to the general formula (2), the hydrolyzable groups (Y' and Z) are not particularly restricted but are preferably selected from the group consisting of ketoximo, acyloxy, alkoxy, amido, aminoxy, amino and alkenoxy groups.

The silicon compound having two or more hydrolyzable groups is not particularly restricted but, more specifically, it includes oximosilanes such as methyltris(methyl ethyl ketoximo)silane and vinyltris(methyl ethyl ketoximo)silane, acetoxysilanes such as methyltrisacetoxysilane, ethyltrisacetoxysilane and vinyltrisacetoxysilane, alkoxysilanes such as methyltrismethoxysilane, ethyltrismethoxysilane, vinyltrismethoxysilane, tetraethoxysilane and tetrapropoxysilane, amidosilanes such as ones represented by the formula shown below, aminoxysiloxanes such as ones represented by the formula shown below, aminosilanes such as methyltriscyclohexylaminosilane, alkenoxysilanes such as methyltrisisopropenoxysilane, and cyclic aminoxysiloxanes such as ones represented by the formula shown below, among others:

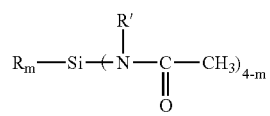

R=methyl, ethyl, vinyl, etc., R'=methyl, ethyl, etc., m=0, 1, 2.

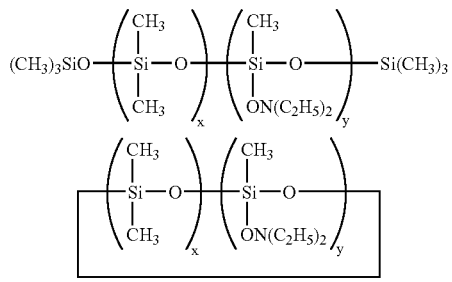

The curable composition according to the first aspect of the invention may contain a polymer having a silicon atom-bound hydrolyzable group(s) and no silanol group.

The skeleton of the polymer having a silicon atom-bound hydrolyzable group(s) and no silanol group includes, but is not limited to, polysiloxane polymers, polyether polymers, hydrocarbon polymers (e.g. polyisobutylene) and vinyl polymers (e.g. (meth)acrylic polymers, styrenic polymers).

In curing the curable composition according to the first aspect of the invention, a condensation catalyst may be used or the use thereof may be omitted. As the condensation catalyst, use may be made of one or two of known silanol condensation catalysts, as necessary, for example tetravalent tin compounds such as dibutyltin dilaurate, dibutyltin diacetate, dibutyltin diethylhexanolate, dibutyltin diocotate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); titanic acid esters such as tetrabutyl titanate and tetrapropyl titanate; organoaluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacectylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; low-molecular-weight polyamide resins obtained from an excess polyamine and a polybasic acid; reaction products from an excess polyamine and an epoxy compound; amino-containing silane coupling agents such as γ-aminopropyltrimethoxysilane and N-(β-aminoethyl)-aminopropylmethyldimethoxysilane; and silanol condensation catalysts, and other silanol condensation catalysts such as acidic and basic catalysts. They are preferably used in an amount of 0 to 10% by weight relative to the silanol-terminated vinyl polymer (I). When an alkoxy group is used as the silicon atom-bound hydrolyzable group Y, this polymer, if used alone, shows a slow rate of curing, hence the use of a curing catalyst is preferred.

In the curable composition according to the first aspect of the invention, there may be incorporated various fillers according to the use thereof. Usable as the filler are reinforcing fillers such as woodmeal, pulp, cotton chips, asbestos, glass fibers, carbon fibers, mica, walnut shell flour, rice hull flour, graphite, diatomaceous earth, clay, fumed silica, precipitated silica, crystalline silica, fused silica, dolomite, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, finely divided aluminum, flint powder, zinc oxide, activated zinc white, zinc dust and shirasu balloons; and fibrous fillers such as asbestos, glass fibers and filaments. For obtaining high strength cured products using such fillers, the use of a filler selected mainly from among fumed silica, precipitated silica, silicic anhydride, hydrous silicic acid, carbon black, surface-treated fine calcium carbonate, calcined clay, clay, activated zinc white and the like in an amount within the range of 1 to 100 parts by weight per 100 parts by weight of the vinyl polymer (I) gives favorable results. When cured products low in strength but high in elongation are desired, the use of a filler selected mainly from among titanium oxide, calcium carbonate, talc, ferric oxide, zinc oxide, shirasu balloons and the like in an amount within the range of 5 to 200 parts by weight per 100 parts by weight of the vinyl polymer (I) gives good results. These fillers may be used singly or two or more of them may be used in admixture.

In the practice of the first aspect of the invention, the use of a filler in combination with a plasticizer is more effective in increasing the elongation of cured products or enabling admixture of the filler in large amounts. The plasticizer is not particularly restricted but, according to the physical property or appearance characteristic which is to be adjusted, use may be made of, for example, the following, either singly or in combination of two or more: phthalate esters such as dibutyl phthalate, diheptyl phthalate, di(2-ethylhexyl)phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinolate; polyalkylene glycol esters such as diethylene glycol dibenzoate, triethylene glycol dibenzoate and pentaerythritol esters; phosphate esters such as tricresyl phosphate and tributyl phosphate; trimellitic acid esters; chlorinated paraffins; hydrocarbon oils such as alkyldiphenyls and partially hydrogenated terphenyl; process oils; polyethers such as polyethylene glycol and polypropylene glycol, or polyethers derived therefrom by partially or totally converting the hydroxyl groups occurring in these molecules to alkoxy groups or the like; epoxy plasticizers such as epoxidized soybean oil and benzyl epoxystearate; polyester plasticizers; etc. The addition of these plasticizers is not always necessary, however. It is also possible to incorporate these plasticizers in the step of polymer production. The use of such a plasticizer in an amount within the range of 0 to 100 parts by weight per 100 parts by weight of the silanol-terminated vinyl polymer (I) gives good results.

While a filler, a plasticizer and a condensation catalyst are mainly used in the curable composition according to the first aspect of the invention, an adhesiveness providing agent such as a phenolic resin, sulfur and a silane coupling agent; a modifier such as a silanol and hydrolyzable group-containing polysiloxane; a tack and weathering resistance improver such as an ultraviolet-curable resin, a pigment, an antioxidant, an ultraviolet absorber and other additives may arbitrarily be added.

As the antisagging agent, there may be mentioned polyamide waxes; hydrogenated castor oil derivatives; metal soaps such as calcium stearate, aluminum stearate and barium stearate, and so on. The use thereof is unnecessary in some instances, however, depending on the intended use or as a result of incorporation of a filler, a reinforcing agent and/or the like.

Usable as the colorant when necessary are inorganic pigments, organic pigments and dyes in common use, among others.

As the physical property modifier, there may be added, when necessary, various silane coupling agents, for example alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyl-dimethoxysilane; silicone varnishes; polysiloxanes and the like. By using such a physical property modifier, it is possible to increase or decrease the hardness or increase the elongation on the occasion of curing of the composition of the invention.

Since the polymer of the invention itself has good adhesiveness to glass, ceramics other than glass, metals and so on and can be caused to adhere to a wide range of materials also by using various primers, the use of an adhesion promoter is not always necessary. It is possible, however, to improve the adhesiveness to a wider range of adherends as well by using one or more of epoxy resins, phenol resins, various silane coupling agents, alkyl titanates, aromatic polyisocyanates and the like.

The curable composition according to the first aspect of the invention may be prepared as a one-pack formulation by compounding all the components beforehand and storing in a tightly closed vessel. In this case, the composition, after application, is cured by moisture in the air. It is also possible to prepare the composition as a two-pack formulation, namely separately preparing a curing agent composition by compounding a curing catalyst, a filler, a plasticizer and water, among others. This composition and the polymer composition are mixed up before application.

The curable composition according to the first aspect of the invention may have a wide variety of forms, from rubber-like to resin-like, according to the molecular weight and main chain skeleton of the polymer. Therefore, this composition can be utilized in or as sealing compositions, adhesives, elastic adhesives, pressure-sensitive adhesives, coatings, powder coatings, foamed products, potting agents for electric or electronic use, films, gaskets, various molding materials, etc.

<<Method of Producing Polymer (II)>>

The second aspect of the present invention is now described.

In accordance with the second aspect of the invention, a vinyl polymer (II) having a hydrolyzable silyl group at one or more termini thereof is produced by reacting a vinyl polymer (I) having a silanol group at one or more termini thereof with a silicon compound having two or more silicon atom-bound hydrolyzable groups. The "hydrolyzable silyl group" means a group resulting from the binding of a hydrolyzable group or groups to a silicon atom.

The vinyl polymer (I) is as described in detail referring to the first aspect of the present invention.

The silicon compound having two or more hydrolyzable groups is not particularly restricted but includes compounds represented by the general formula (2):

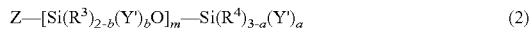

$$Z—[Si(R^3)_{2-b}(Y')_b O]_m—Si(R^4)_{3-a}(Y')_a \quad (2)$$

wherein $R^3$ and $R^4$ are the same or different and each represents an alkyl group containing 1 to 20 carbon atoms, an aryl group containing 6 to 20 carbon atoms, an aralkyl group containing 7 to 20 carbon atoms or $(R')_3SiO—$ (in which R' is a hydrocarbon group containing 1 to 20 carbon atoms and the three R' groups may be the same or different) and, when there are two or more $R^3$ or $R^4$ groups, they may be the same or different, Y' represents a hydrolyzable group other than a hydroxyl group, Z represents an alkyl group containing 1 to 20 carbon atoms, an aryl group containing 6 to 20 carbon atoms, an aralkyl group containing 7 to 20 carbon atoms, a triorganosiloxy group represented by $(R')_3SiO—$ (in which R' is as defined above) or a hydrolyzable group other than a hydroxyl group, a represents 0, 1, 2 or 3, b represents 0, 1 or 2 and m is an integer of 0 to 19 provided that when Z is a hydrolyzable group, the relation a+mb≧1 should be satisfied and, when Z is other than a hydrolyzable group, the relation a+mb≧2 should be satisfied. Here, it is preferred that m=0.

Referring to the general formula (2), the hydrolyzable groups (Y' and Z) are not particularly restricted but are preferably selected from the group consisting of ketoximo, acyloxy, alkoxy, amido, aminoxy, amino and alkenoxy groups.

The silicon compound having two or more hydrolyzable groups is not particularly restricted but, more specifically, it includes those compounds mentioned hereinabove referring to the first aspect of the invention.

The reaction may be carried out under ordinary alcohol elimination/condensation reaction conditions. The reaction conditions may depend on the silanol group and on the substituents of the silicon compound having two or more hydrolyzable groups. Generally, however, the reaction temperature is preferably 0 to 100° C., more preferably 20 to 80° C. The reaction time is preferably 1 to 20 hours, more preferably 2 to 8 hours. The reaction may be carried out under ordinary pressure, increased pressure or reduced pressure ordinary pressure is preferred, however, since the apparatus can be simplified and the production procedure becomes easy. The reaction is preferably carried out in an inert gas atmosphere.

In the above production method, it is preferred that one mole silanol group react with one mole of the silicon compound having two or more silicon atom-bound hydrolyzable groups. For suppressing side reactions, the reaction is preferably carried out under conditions such that the silicon compounds having two or more hydrolyzable groups occur in excess (more preferably in large excess). Specifically, the reaction is preferably carried out under conditions such that the mole ratio between the silanol group and the silicon compound having two or more one-mole hydrolyzable groups amounts to 1:3 or more (more preferably 1:5 or more).

Although this reaction is preferably carried out in the absence of any catalyst, the reaction may be promoted by using a transesterification catalyst in common use. As this catalyst, there may be mentioned organometal catalysts such as $Ti(OEt)_4$, $Ti(OBu)_4$, $Ti(OPr)_4$, SnO, $Sn(COO)_2$, $Bu_2SnO$, $Bi(OH)_3$, $Zn(CH_3COO)_2.2H_2O$, $Pb(CH_3COO)_2.3H_2O$, $Pb(C_6H_5COO)_2.H_2O$, PbO, $Sn_2O_3$, $Al(CH_3COO)_3$, $Mn(CH_3COO)_2.4H_2O$, $Co(CH_3COO)_2.4H_2O$, $Cd(CH_3COO)_2$, $Cd(COO)_2$, dibutyltin laurate, dibutyltin dimaleate, dibutyltin thiocarboxylates, dioctyltin mercaptides and stannous octoate, lead octenoate, triethylenediamine, tetramethylguanidine, 2-(dimethylaminomethyl)phenol, N,N,N',N'-tetramethylhexane-1,6-diamine, 1,8-diazabicyclo[5.4.0]undecene-7, p-toluenesulfonic acid and trifluoroacetic acid, among others. Among them, the use of p-toluenesulfonic acid or trifluoroacetic acid is preferred. When these catalysts are used, the amount thereof is preferably 0.1 to 5% by weight based on the total amount of the silanol group and the silicon compound having two or more hydrolyzable groups.

While the above reaction is preferably carried out in the absence of any solvent, an organic solvent may be used for facilitating the control of the reaction or decreasing the viscosity of the reaction mixture, for instance. This organic solvent may be any of the solvents capable of dissolving the starting materials and reaction product and inert under the reaction conditions. Thus, for example, diethyl ether, tetrahydrofuran, acetone, methyl ethyl ketone, benzene, toluene, xylene, hexane, mineral spirit and the like are adequate.

The second aspect of the invention is also directed to a vinyl polymer (II) having a hydrolyzable silyl group at one or more termini thereof and obtainable by such a production method as mentioned above. This polymer is not limited to the one produced by the method described herein.

<<Curable Composition>>

The vinyl polymer (II) having a hydrolyzable silyl group at one or more termini thereof, according to the second aspect of the invention, can be used in formulating a curable composition which utilizes the condensation reaction of the hydrolyzable silyl group. In the description which follows, the vinyl polymer having a hydrolyzable silyl group at one or more termini thereof, according to the second aspect of the invention, is sometimes referred to as "polymer (II)".

In curing the curable composition according to the second aspect of the invention, a condensation catalyst may be used or the use thereof may be omitted. As the condensation catalyst, use may be made of one or two of known silanol condensation catalysts, as necessary, for example tetravalent tin compounds such as dibutyltin dilaurate, dibutyltin diacetate, dibutyltin diethylhexanolate, dibutyltin dioctoate, dibutyltin di (methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); titanic acid esters such as tetrabutyl titanate and tetrapropyl titanate; organoaluminum compounds such as aluminum trisacetylacetonate, aluminum tris(ethyl acetoacetate) and diisopropoxyaluminum ethyl acetoacetate; chelate compounds such as zirconium tetraacetylacetonate and titanium tetraacetylacetonate; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; low-molecular-weight polyamide resins obtained from an excess polyamine and a polybasic acid; reaction products from an excess polyamine and an epoxy compound; amino-containing silane coupling agents such as γ-aminopropyltrimethoxysilane and N-(β-aminoethyl)aminopropylmethyldimethoxysilane; and silanol condensation catalysts, and other silanol condensation catalysts such as acidic and basic catalysts. They are preferably used in an amount of 0 to 10% by weight relative to the vinyl polymer (II). When an alkoxy group is used as the hydrolyzable group Y, this polymer, if used alone, shows a slow rate of curing, hence the use of a curing catalyst is preferred.

Since the polymer of the invention itself has adhesiveness to glass, ceramics other than glass, metals and so forth or can be adhered to a wide range of materials by using various primers, an adhesion promoter is not always necessary but, for attaining stable adhesiveness to various substrates, parts, supports and adherends, the use thereof is preferred.

As the adhesion promoter, there may be mentioned resol type or novolak type phenol resins obtained by reacting a phenolic compound, such as phenol, cresol, xylenol, resorcinol, an alkylphenol or a modified phenol (e.g. cashew oil-modified phenol, tall oil-modified phenol), with an aldehyde compound, such as formalin or paraformaldehyde; sulfur; epoxy resins such as bisphenol A-based epoxy resins, bisphenol F-based epoxy resins, novolak-based epoxy resins, bisphenol A-propylene oxide adduct glycidyl ether type epoxy resins and hydrogenated bisphenol A-based epoxy resins; alkyl titanates such as tetrabutyl titanate, aromatic polyisocyanates such as tolylene diisocyanate and diphenylmethanediisocyanate; compounds having an amino group and a crosslinking silyl group in each molecule, such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane and N-(β-aminoethyl)-γ-aminopropylmethyldimethoxysilane; compounds having an epoxy group and a crosslinking silyl group in each molecule, such as γ-glycidoxypropyltrimethoxysilane, γ-glycidoxypropyltriethoxysilane and γ-glycidoxypropylmethyldimethoxysilane; compounds having a mercapto group and a crosslinking silyl group in each molecule, such as γ-mercaptopropyltrimethoxysilane, γ-mercaptopropyltriethoxysilane and γ-mercaptopropylmethyl-dimethoxysilane; compounds having an isocyanato group and a crosslinking silyl group in each molecule, such as γ-isocyanatopropyltrimethoxysilane, γ-isocyanatopropyltriethoxysilane and γ-isocyanatopropylmethyldimethoxysilane; reaction products from such a compound having an amino group and a crosslinking silyl group in each molecule as mentioned above and such a compound having an epoxy group and a crosslinking silyl group in each molecule or a compound having an isocyanato group and a crosslinking silyl group in each molecule as mentioned above; reaction products from a compound having a (meth)acryloxy group and a crosslinking silyl group in each molecule, such as γ-(meth)acryloxypropyltrimethoxysilane, γ-(meth)acryloxypropyltriethoxysilane or γ-(meth)acryloxypropylmethyldimethoxysilane, and such a compound having an amino group and a crosslinking silyl group in each molecule as mentioned above; and so on. These may be used singly or two or more of them may be used combinedly. Among them, compounds having an organic group containing at least one atom selected from among nitrogen, oxygen and sulfur atoms and a crosslinking silyl group in each molecule, such as compounds having an amino group and a crosslinking silyl group in each molecule, compounds having an epoxy group and a crosslinking silyl group in each molecule, compounds having a mercapto group and a crosslinking silyl group in each molecule, reaction products from a compound having an amino group and a crosslinking silyl group in each molecule and a compound having an epoxy group and a crosslinking silyl group in each molecule, reaction products from a compound having a (meth) acryloxy group and a crosslinking silyl group in each molecule and a compound having an amino group and a crosslinking silyl group in each molecule, are preferred since, when these are used, it is relatively easy to control the physical properties and adhesiveness. More preferred from the high adhesiveness viewpoint are those compounds having, in each molecule, a nitrogen-containing organic group and a crosslinking silyl group in which the above-mentioned organic group containing at least one atom selected from among nitrogen, oxygen and sulfur atoms is an amino group, an isocyanato group or a group resulting from reaction of these.

The above adhesion promoter is preferably used in an amount of 0.01 to 20 parts by weight per 100 parts by weight of the vinyl polymer (II). When the amount is 0.01 part by weight, the adhesiveness improving effect can hardly be produced. An amount exceeding 20 parts by weight adversely affects the physical properties of cured products. The addition amount of the adhesion promoter is preferably 0.01 to 10 parts by weight, more preferably 0.5 to 5 parts by weight.

A physical property modifier may be used to increase the hardness upon curing of the curable composition or decrease the hardness and increase the elongation instead, or otherwise modify the physical properties. As the physical property modifier to be added as necessary, there may be mentioned, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; various silane coupling agents such as vinyltrimethoxysilane and vinylmethyldimethoxysilane, silicone varnishes; polysiloxanes; and the like. Addition in an amount within the range of 0 to 20 parts by weight per 100 parts by weight of the vinyl polymer (II) gives good results.

A curability modifier may be added to increase or decrease the rate of curing of the curable composition and, further, a storage stability improver may be added to inhibit the viscosity from increasing during storage. As the curability modifier or storage stability improver, there may be mentioned alcohols such as methanol and ethanol; ortho esters such as methyl orthoformate; crosslinking silyl-containing compounds such as tetraethoxysilane, methyltrimethoxysilane and vinyltrimethoxysilane; carboxylic acids such as 2-ethylhexanoic acid, and so forth. Addition in an amount within the range of 0 to 20 parts by weight per 100 parts by weight of the vinyl polymer (II) gives favorable results.

In the curable composition according to the second aspect of the invention, there may be incorporated various fillers according to the use of the composition. Usable as the filler are reinforcing fillers such as woodmeal, pulp, cotton chips, asbestos, glass fibers, carbon fibers, mica, walnut shell flour, rice hull flour, graphite, diatomaceous earth, clay, fumed silica, precipitated silica, crystalline silica, fused silica, dolomite, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, finely divided aluminum, flint powder, zinc oxide, activated zinc white, zinc dust and shirasu balloons; and fibrous fillers such as asbestos, glass fibers and filaments. For obtaining high strength cured products using such fillers, the use of a filler selected mainly from among fumed silica, precipitated silica, silicic anhydride, hydrous silicic acid, carbon black, surface-treated fine calcium carbonate, calcined clay, clay, activated zinc white and the like in an amount within the range of 1 to 100 parts by weight per 100 parts by weight of the vinyl polymer (II) gives favorable results. When cured products low in strength but high in elongation are desired, the use of a filler selected mainly from among titanium oxide, calcium carbonate, talc, ferric oxide, zinc oxide, shirasu balloons and the like in an amount within the range of 5 to 200 parts by weight per 100 parts by weight of the vinyl polymer (II) gives good results. These fillers may be used singly or two or more of them may be used in admixture.

In the practice of the second aspect of the invention, the use of a filler in combination with a plasticizer is more effective in increasing the elongation of cured products or enabling admixture of the filler in large amounts. The plasticizer is not particularly restricted but, according to the physical property or appearance characteristic which is to be adjusted, use may be made of, for example, the following, either singly or in combination of two or more: phthalate esters such as dibutyl phthalate, diheptyl phthalate, di(2-ethylhexyl)phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetyllicinolate; polyalkylene glycol esters such as diethylene glycol dibenzoate, triethylene glycol dibenzoate and pentaerythritol esters; phosphate esters such as tricresyl phosphate and tributyl phosphate; trimellitic acid esters; chlorinated paraffins; hydrocarbon oils such as alkyldiphenyls and partially hydrogenated terphenyl; process oils; polyethers such as polyethylene glycol and polypropylene glycol, or polyethers derived therefrom by partially or totally converting the hydroxyl groups occurring in these molecules to alkoxy groups or the like; epoxy plasticizers such as epoxidized soybean oil and benzyl epoxystearate; polyester plasticizers; etc. The addition of these plasticizers is not always necessary, however. It is also possible to incorporate these plasticizers in the step of polymer production. The use of such a plasticizer in an amount within the range of 0 to 100 parts by weight per 100 parts by weight of the vinyl polymer (II) gives good results.

While a filler, a plasticizer and a condensation catalyst are mainly used in the curable composition according to the second aspect of the invention, an adhesiveness providing agent such as a phenolic resin, sulfur or a silane coupling agent; a modifier such as a silanol or hydrolyzable group-containing polysiloxane; a tack and weathering resistance improver such as an ultraviolet-curable resin, a pigment, an antioxidant, an ultraviolet absorber and other additives may arbitrarily be added.

As the antisagging agent, there may be mentioned polyamide waxes; hydrogenated castor oil derivatives; metal soaps such as calcium stearate, aluminum stearate and barium stearate, and so on. The use thereof is unnecessary in some instances, however, depending on the intended use or as a result of incorporation of a filler, a reinforcing agent and/or the like.

Usable as the colorant when necessary are inorganic pigments, organic pigments and dyes in common use, among others.

As the physical property modifier, there may be added, when necessary, various silane coupling agents, for example alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; polysiloxanes and the like. By using such a physical property modifier, it is possible to increase or decrease the hardness or increase the elongation on the occasion of curing of the composition of the invention.

Another hydrolyzable silyl-containing polymer may be added to the curable composition according to the second aspect of the invention. The other hydrolyzable silyl-containing polymer is not particularly restricted in skeletal structure but includes polysiloxane polymers, polyether polymers, hydrocarbon polymers (polyisobutylene etc.) and the like.

The curable composition according to the second aspect of the invention may be prepared as a one-pack formulation by compounding all the components beforehand and storing in a tightly closed vessel. In this case, the composition, after application, is cured by moisture in the air. It is also possible to prepare the composition as a two-pack formulation, namely separately preparing a curing agent composition by compounding a curing catalyst, a filler, a plasticizer and water, among others. This composition and the resin composition are mixed up before application.

The curable composition according to the second aspect of the invention may have a wide variety of forms, from rubber-like to resin-like, according to the molecular weight and main chain skeleton of the polymer. Therefore, this composition can be utilized in or as sealing compositions, adhesives, elastic adhesives, pressure-sensitive adhesives, coatings, powder coatings, foamed products, potting agents for electric or electronic use, films, gaskets, various molding materials, etc.

In using the composition containing the polymer (II) as a sealing composition, the polymer (II) preferably has a molecular weight (weight average molecular weight) of 1,000 to 1,000,000.

The filler which can be added to the curable composition according to the second aspect of the invention for adjusting the mechanical properties when the composition is to be used as a sealing composition includes, more specifically, reinforcing fillers such as fumed silica, precipitated silica, silicic anhydride, hydrous silicic acid and carbon black; fillers such as calcium carbonate, magnesium carbonate, diatomaceous earth, calcined clay; clay, talc, titanium oxide, bentonite, organic bentonite, ferric oxide, zinc oxide, activated zinc white and shirasu balloons; and fibrous fillers such as asbestos, glass fibers and filaments. For obtaining high strength cured products using such fillers, the use of a filler mainly selected from among fumed silica, precipitated silica, silicic anhydride, hydrous silicic acid, carbon black, surface-treated fine calcium carbonate, calcined clay, clay, activated zinc white and the like at an addition amount within the range of 1 to 200 parts by weight per 100 parts by weight of the vinyl polymer (II) gives favorable results. When cured products low in strength but high in elongation are desired, the use of a filler selected mainly from among titanium oxide, calcium carbonate, talc, ferric oxide, zinc oxide, shirasu balloons and the like at an addition amount within the range of 1 to 200 parts by weight per 100 parts by weight of the vinyl polymer (II) gives good results. These fillers may be used singly or two or more of them may be used in admixture.

More specific examples of the plasticizer which can be added for adjusting the physical properties and viscosity include phthalate esters such as dibutyl phthalate, diheptyl phthalate, di(2-ethylhexyl)phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinolate; polyalkylene glycol esters such as diethylene glycol dibenzoate, triethylene glycol dibenzoate and pentaerythritol esters; phosphate esters such as tricresyl phosphate and tributylphosphate; trimelliticacidesters; chlorinatedparaffins; hydrocarbon oils such as alkyldiphenyls and partially hydrogenated terphenyl; process oils; polyethers such as polyethylene glycol and polypropylene glycol, or polyethers derived therefrom by partially or totally converting the hydroxyl groups occurring in these molecules to alkoxy groups or the like; epoxy plasticizers such as epoxidized soybean oil and benzyl epoxystearate; polyester plasticizers; etc. These may be used singly or two or more of them may be used in admixture. The addition of these plasticizers is not always necessary, however. It is also possible to incorporate these plasticizers in the step of polymer production. The use of such a plasticizer in an amount within the range of 0 to 100 parts by weight per 100 parts by weight of the vinyl polymer (II) gives good results.

For use as a sealing composition, the curable composition according to the second aspect of the invention may be prepared as a one-pack preparation by compounding all components in advance and storing the whole in a tightly sealed state, which preparation, after application, is allowed to be cured by absorption of the moisture in the air, or as a two-pack preparation by separately preparing a curing agent composition by compounding such components as a curing catalyst, a filler, a plasticizer and water, which composition is mixed with a polymer composition prior to use. The one-pack type is more preferred, since it can be handled with ease and the possibility of failure in application is slight.

In cases where the composition comprising the polymer (II) is used as an composition for use in adhesive compositions, the polymer (II) preferably has a Tg of not higher than −20° C. and preferably has a molecular weight (weight average molecular weight) of 1,000 to 1,000,000. For further improving the adhesiveness against substrates, an acid group-containing monomer is preferably copolymerized.

When the curable composition according to the second aspect of the invention is used as a pressure-sensitive adhesive composition, the addition of a tackifier resin is not always necessary since its main component is the vinyl polymer. When necessary, however, various tackifiers can be used. Specific examples are phenol resins, modified phenol resins, cyclopentadiene-phenol resins, xylene resins, chroman resins, petroleum resins, terpene resins, terpene-phenol resins, rosin esters and the like.

More specific examples of the solvent to be used for adjusting the workability are, among others, aromatic hydrocarbon solvents such as toluene and xylene, ester solvents such as ethyl acetate, butyl acetate, amyl acetate and cellosolve acetate, and ketone solvents such as methyl ethyl ketone, methyl isobutyl ketone and diisobutyl ketone. Those solvents may be used also in the step of polymer production.

The plasticizer is not particularly restricted but includes, among others, liquid polybutene, mineral oils, lanolin, liquid polyisoprene and liquid polyacrylates. The filler is not particularly restricted but includes, among others, zinc white, titanium white, calcium carbonate, clay and various pigments. The antioxidant is not particularly restricted but includes, among others, rubber antioxidants (phenolic, amine type) and metal dithiocarbamates. The above-mentioned tackifiers, plasticizers, fillers and antioxidants may respectively be used singly or two or more species may respectively be used in combination.

The above pressure-sensitive adhesive composition can be applied to a wide variety of targets such as tapes, sheets, labels and foils. For example, the above pressure-sensitive adhesive composition may be applied in the form of a solvent base, emulsion base or hot melt composition to various substrate materials such as films made of a synthetic resin or modified natural resin, paper, all kinds of cloth, metal foils, metallized plastic foils, asbestos or glass fiber cloths and the like and then cured by exposure to moisture or water at ordinary temperature or with heating.

When the composition comprising the polymer (II) is used as a composition for use in coatings where the coatings are required to have a certain degree of hardness, hence a certain crosslinking density is required. Therefore, the polymer (II) to be used for coating purposes preferably has a crosslinking silyl value of about 20 to 200. Thus, when no crosslinking silyl-containing monomer is copolymerized, the polymer (II) preferably has a number average molecular weight of about 50 to 5,000. However, even a polymer (II) having a number average molecular weight higher than 5,000 can also be used by copolymerizing a crosslinking silyl-containing monomer. The polymer (II) to be used for coating purposes preferably has a Tg of −30° C. to 100° C., more preferably −10° C. to 60° C. A polymer having a desired Tg can be synthesized by adjusting the species and proportions of the vinyl monomers to be used. When the composition comprising the polymer (II) is used as a composition for use in coatings, the composition may contain, in addition to the polymer (II), any crosslinking silyl-containing low molecular compound known in the art, any crosslinking silyl-containing polymer known in the art, any resin known in the art for use in coatings, and the like.

When the curable composition according to the second aspect of the invention is used as a high-solid coating, the method comprising copolymerizing a compound having both a polymerizable alkenyl group and a crosslinking silyl group in each molecule with another vinyl monomer may also be mentioned as a preferred method of obtaining a vinyl polymer having a high crosslinking silyl value, since the production process becomes simple. By using such method, it becomes possible for the coating to have a high solid content.

Among the compounds having both a polymerizable alkenyl group and a crosslinking silyl group in each molecule, those in which the crosslinking silyl group is an alkoxysilyl group are preferred from the cost and/or stability viewpoint. Thus, for example, the following are particularly preferred:

$CH_2$=$CHCO_2(CH_2)_3Si(OCH_3)_3$,
$CH_2$=$CHCO_2(CH_2)_3Si(CH_3)(OCH_3)_2$,
$CH_2$=$C(CH_3)CO_2(CH_2)_3Si(OCH_3)_3$, $CH_2$=$C(CH_3)CO_2(CH_2)_3Si(CH_3)(OCH_3)_2$. These compounds may be used singly or two or more of them may be used in admixture.

The copolymerizing ratio between the compound having both a polymerizable alkenyl group and a crosslinking silyl group and the other vinyl monomer is not particularly restricted but it is preferred that that compound account for 1 to 50 mole percent, preferably 2 to 40 mole percent, more preferably 3 to 30 mole percent, based on the total polymerization composition. When the amount of the compound having both a polymerizable alkenyl group and a crosslinking silyl group is smaller than 1 mole percent, the curing becomes insufficient and, when it exceeds 50 mole percent, the storage stability becomes low.

When necessary, it is possible to add, to that coating composition, such an additive as a resin, for example a polyester, epoxy or acrylic, a coloring auxiliary, a spreading agent, an antifoam and an antistatic agent, in addition to the additives mentioned hereinabove referring to the curable adhesive composition. As more specific examples of the colorant to be used in this coating composition, there may be mentioned inorganic pigments such as titanium dioxide, carbon black, iron oxide and chromium oxide, and organic pigments such as phthalocyanine and quinacridone pigments, among others. The addition amount of these additives can appropriately be selected according to the characteristics required. The additives may also be used in admixture.

When a curing catalyst and an additive(s) are added to the vinyl polymer (II) as necessary and the resulting composition is applied to a substrate to be coated and then cured, a uniform coating film can be obtained. The hydrolysis and/or condensation of the crosslinking silyl group proceeds at room temperature, hence heating is not always necessary in the step of curing. For promoting the curing, however, heating may be applied. The heating temperature is 20 to 200° C., preferably 50 to 180° C.

This coating composition can be used as a solvent base one or a water base one. It is also possible to use the composition as a powder coating by distilling off the volatile matter from the main component vinyl polymer, adding desired additives and finely dividing the resulting composition.

When the curable composition according to the second aspect of the invention is used as a coating which can have a high solid content and is excellent in elastic properties, at least one of the crosslinking silyl groups preferably occur at a molecular chain terminus. It is also possible, however, to introduce a crosslinking silyl group into the molecular chain by copolymerizing a small amount of a compound having both a polymerizable alkenyl group and a crosslinking silyl group in each molecule to thereby adjust the molecular weight between crosslinking sites.

As examples of such compound, there may be mentioned
$CH_2$=$CHCO_2(CH_2)_3Si(OCH_3)_3$,
$CH_2$=$CHCO_2(CH_2)_3Si(CH_3)(OCH_3)_2$,
$CH_2$=$C(CH_3)CO_2(CH_2)_3Si(OCH_3)_3$,
$CH_2$=$C(CH_3)CO_2(CH_2)_3Si(CH_3)(OCH_3)_2$,
$CH_2$=$CHCO_2(CH_2)_3Si(OC_2H_5)_3$,
$CH_2$=$CHCO_2(CH_2)_3Si(CH_3)(OC_2H_5)_2$,
$CH_2$=$C(CH_3)CO_2(CH_2)_3Si(OC_2H_5)_3$,
$CH_2$=$C(CH_3)CO_2(CH_2)_3Si(CH_3)(OC_2H_5)_2$,
$CH_2$=$CHCO_2(CH_2)_3Si(OC_2H_5)_3$,
$CH_2$=$CHCO_2(CH_2)_3Si(CH_3)(OC_2H_5)_2$,
$CH_2$=$C(CH_3)CO_2(CH_2)_3Si(OC_2H_5)_3$, $CH_2$=$C(CH_3)CO_2(CH_2)_3Si(CH_3)(OC_2H_5)_2$. These compounds may be used singly or two or more of them may be used in admixture.

In this composition for use in coatings, there may be incorporated, when necessary, one or more additives, for example resins such as polyester, epoxy and acrylic resins, coloring aids, spreading agents or antiforming agents, antistatic agents and the like, in addition to the additives mentioned hereinabove referring to the curable adhesive composition. The colorant to be used in that composition for use in coatings more specifically includes inorganic pigments such as titanium dioxide, carbon black, iron oxide and chromium oxide and organic pigments such as the phthalocyanine and quinacridone series, among others. The addition amounts of these additives can be adequately selected according to the characteristics required. They may also be used in admixture.

When the vinyl polymer (II) with a curing catalyst or an additive(s) added as necessary is applied to a substrate to be coated, and then allowed to cure, a uniform coating film can be obtained. The hydrolysis and/or condensation of the crosslinking silyl group proceeds at room temperature and, therefore, no heating is required in the step of curing. For promoting the curing, however, heating may be made. The heating temperature is 20 to 200° C., preferably 50 to 180° C.

This composition for use in coatings can be used as a solvent base or water base coating. It is also possible to use it as a powder coating by distilling off the volatile matter from the main component vinyl polymer, adding desired components and then finely dividing the resulting compound.

When the composition comprising the polymer (II) as a composition for use in adhesive compositions, the polymer (II) preferably has a molecular weight (weight average molecular weight) of 1,000 to 1,000,000. By combining this polymer (II) with a condensation curing agent and other components known in the art, it is possible to use the composition as a one-pack or two-pack adhesive. When the composition comprising the polymer (II) as a composition for use in adhesives, this composition may contain, when necessary, one or more of the additives known in the art, such as tackifiers, coupling agents, thixotropic agents, inorganic fillers and stabilizers. The tackifiers are not particularly restricted but include, among others, terpene resins, phenol resins, terpene-phenol resins, rosin resins and xylene resins. The coupling agents are not particularly restricted but include, among others, silane coupling agents and titanate coupling agents. The inorganic fillers are not particularly restricted but include, among others, carbon black, titanium white, calcium carbonate and clay. The thixotropic agents are not particularly restricted but include, among others, Aerosil and Disperon. The stabilizers are not particularly restricted but include, among others, ultraviolet absorbers, antioxidants, heat stabilizers and stabilizers against hydrolysis. The above-mentioned tackifiers, coupling agents, thixotropic agents, inorganic fillers and stabilizers may respectively be used singly or two or more may be used in combination.

The field of application of the above adhesive is not particularly restricted but includes, among others, the uses thereof as an adhesive for food packaging, an adhesive for shoes and footwear, a decorative paper adhesive, a wood adhesive, a structural adhesive (for cars, septic tanks, houses), a magnetic tape binder, a binder for textile treatment and a textile auxiliary. When the composition comprising the polymer (II) is used as a composition for use in artificial leathers or synthetic leathers, this composition may contain any of those compounds known in the art to be useful in making artificial leathers or synthetic leathers, as necessary. For example, mention may be made of chain extenders and solvents. In addition, condensation catalysts, promoters, pigments, dyes, surfactants, textile softening agents, ultraviolet absorbers, antioxidants, hydrolysis preventing agents, antifungal agents, inorganic fillers, organic fillers, matting agents, antiforming agents and the like may also be used where necessary.

This composition can be used in making artificial leathers as well as dry method synthetic leathers and wet method synthetic leathers. When the composition comprising the polymer (II) is used as a printing ink composition, any of those compounds known in the art to be useful in printing inks can be used in that composition, if necessary. For example, solvents and the like may be mentioned. The solvents include alcohols such as ethanol and isopropanol, ketones such as acetone, MEK, MIBK and cyclohexanone, aromatic hydrocarbons such as toluene and xylene, halogenated hydrocarbons such as chlorobenzene, trichlene and perchlene, ethers such as THF and dioxane and esters such as cellosolve acetate, ethyl acetate and butyl acetate and these may used singly or two more may be used combinedly. Further, where necessary, condensation catalysts, promoters, colorants such as pigments, surfactants, ultraviolet absorbers, antioxidants, hydrolysis preventing agents and so forth may be used. In producing printing ink compositions, nitrocellulose, polyvinyl chloride, vinyl chloride-vinyl acetate copolymers, polyamides, acrylic ester polymers and so on may also be incorporated.

When the composition comprising the polymer (II) is used as a resin composition for use in flooring materials, any of those compounds known in the art to be useful in flooring resin compositions can be used. For example, mention may made of solvents. The solvents include alcohols such as ethanol and isopropanol, ketones such as acetone, MEK, MIBK and cyclohexanone, aromatic hydrocarbons such as toluene and xylene, halogenated hydrocarbons such as chlorobenzene, trichlene and perchlene, ethers such as THF and dioxane and esters such as cellosolve acetate, ethyl acetate and butyl acetate and these may used singly or two more may be used combinedly. Further, where necessary, condensation catalysts, promoters, plasticizers, tackifiers, colorants such as pigments, surfactants, ultraviolet absorbers, antioxidants, hydrolysis preventing agents, fillers, antiforming agents and so forth may be used.

The field of application of the above flooring resin composition is not particularly restricted but includes, among others, the uses thereof as a ship or building flooring material, a coating film waterproofing agent, a sheet waterproofing agent, a spray-on waterproofing agent, a sealing agent, an adhesive for artificial lawn and so on, a pavement asphalt modifier, an elastic paving composition for use in tennis courts and athletic fields and a floor concrete protective coating.

When the composition containing the polymer (II) is used as a foaming composition, the polymer (II) preferably has a molecular weight (weight average molecular weight) of 1,000 to 1,000,000. In this case, it may contain water, a surfactant (e.g. silicone, nonionic or ionic), an additive(s) (e.g. flame retardant, antimicrobial agent, colorant, filler, stabilizer) a forming agent, etc.

<<Method of Producing the Polymer (III)>>

The third aspect of the invention is now described.

According to the third aspect of the invention, a vinyl polymer (III) having an acrylic functional group at one or more termini thereof is produced by reacting the vinyl polymer (I) having a silanol group at one or more termini thereof with a silicon compound represented by the general formula (3):

$$XSiR_2\text{—}G\text{—}O\text{—}C(O)C(L)\text{=}CH_2 \quad (3)$$

wherein R is a hydrocarbon group containing 1 to 14 carbon atoms or a halogenated hydrocarbon group containing 1 to 10 carbon atoms and the two R groups may be the same or different, X is a hydrolyzable group, G is an alkylene group containing 1 to 4 carbon atoms and L is a hydrogen atom or a hydrocarbon group containing 1 to 20 carbon atoms.

The acrylic functional group so referred to herein means a group represented by —C(O)C(L)=CH$_2$ (L being as defined above).

The polymer (I) is as mentioned in detail referring to the first aspect of the invention.

In the general formula (3), G includes, but is not limited to, groups represented by —CH$_2$—, —CH$_2$CH$_2$—, —CH$_2$CH$_2$CH$_2$— and —CH$_2$CH(CH$_3$)CH$_2$— and L is a hydrogen atom or a methyl group.

In that reaction, X is a silicon atom-bound hydrolyzable group capable of being condensed with the silanol group of the polymer (I) to form a siloxane (namely Si—O—Si) or capable of being hydrolyzed to form an SiOH group while the above-mentioned silicon compound is then condensed with the silanol group of the polymer (I) to form a siloxane bond. The group X is selected from among those silicon atom-bound hydrolyzable groups mentioned hereinabove referring to the silicon compound to be used in producing the silanol-terminated vinyl polymer (I) and preferably having both a silicon atom-bound hydrolyzable group and a hydrosilyl group as represented by the general formula (17). X is preferably a chlorine atom, and particularly preferred silicon compound is either 3-acryloxypropyldimethylchlorosilane or 3-methacryloxypropyldimethylchlorosilane.

Typically, this reaction is carried out in an organic solvent (e.g. tetrahydrofuran (THF), diethyl ether, chloroform, toluene, hexane, or a mixture thereof). The reaction temperature to be used for this condensation will depend on the group X employed, as will be understood by those skilled in the art. This is because some X group species readily react at room temperature, while others need a high temperature or even a condensation catalyst for the completion of the reaction. Such specific combinations required are well within the range of ordinary knowledge those skilled in the art have and the best combination can be readily selected based on the results of routine experiments. In a certain preferred embodiment, X is chlorine and the subsequent reaction is generally carried out in the presence of an acid acceptor, for example pyridine, triethylamine or dibutylamine, to neutralize the byproduct hydrochloric acid. In this mode of embodiment, the reaction temperature is preferably 0 to 100° C.

The third aspect of the invention is further directed to the vinyl polymer (III) having an acrylic functional group at one or more termini thereof and obtainable by such a production method as mentioned above. This polymer is not limited to the one produced by the method described herein.

The vinyl polymer (III) according to the third aspect of the invention is not particularly restricted in molecular weight distribution, namely ratio (Mw/Mn) between weight average molecular weight (Mw) and number average molecular weight (Mn). For suppressing the viscosity of the curable composition derived therefrom to a low level and facilitating the handling of the composition and for attaining sufficient curing product physical properties, however, the molecular weight distribution should preferably be narrow. The value of the molecular weight distribution is preferably less than 1.8, more preferably not more than 1.7, still more preferably not more than 1.6, still more preferably not more than 1.5, still more preferably not more than 1.4, still more preferably not more than 1.3. The molecular weight distribution is most usually measured by gel permeation chromatography (GPC). Chloroform or THF is used as the mobile phase and polystyrene gel columns are used as the column, and the number average molecular weight and other values can be determined on the polystyrene equivalent basis.

<<Curable Composition>>

The vinyl polymer having an acrylic functional group at one or more termini thereof, according to the third aspect of the invention, can be used as the main component of a curable composition.

The curable composition according to the third aspect of the invention is not particularly restricted but includes one curable by heating or irradiation with light and/or electron beams.

<Photo- and/or Electron Beam-Curable Composition>

In the following, the curable composition capable of curing upon irradiation with light and/or electron beams is described.

This photo- and/or electron beam-curable composition preferably contains a photopolymerization initiator.

The photopolymerization initiator to be used in the practice of the invention is not particularly restricted but includes, as preferred species, photo radical initiators and photo anion initiators, such as acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzyl methoxy ketal and 2-chlorothioxanthone. These initiators may be used singly or in combination with another compound. Specifically, there may be mentioned the combination with an amine such as diethanolmethylamine, dimethylethanolamine and triethanolamine, a further combination thereof with an iodonium salt such as diphenyliodonium chloride, and the combination of a dye such as methylene blue with an amine, for instance.

A near infrared absorbing cationic dye may also be used as a near infrared photopolymerization initiator. Preferred for use as the near infrared absorbing cationic dye are, among others, those near infrared absorbing cationic dye-borate anion complexes disclosed, for example, in Japanese Kokai Publication Hei-03-111402 and Japanese Kokai Publication Hei-05-194619, which are excited by light energy within the range of 650 to 1500 nm. The combined use of a boron-containing sensitizer is more preferred.

Since a slight extent of photofunctionalization of the system is quite sufficient, the addition amount of the photopolymerization initiator is not particularly restricted but is preferably 0.001 to 10 parts by weight per 100 parts by weight of the polymer in that composition.

The curable composition according to the third aspect of the invention basically comprises the above components as main components. Preferably, it is free of any other polymerizable monomer so that the residual monomer odor problem may be cleared up. According to the intended purpose, however, a polymerizable monomer and/or oligomer and various additives may be used combinedly. Preferred as the polymerizable monomer and/or oligomer is a monomer and/or oligomer having a radical-polymerizable group or a monomer and/or oligomer having an anion-polymerizable group. As the radical-polymerizable group, there may be mentioned acrylic functional groups such as a (meth) acrylic group, as well as groups derived from styrene, acrylonitrile, vinyl esters, N-vinylpyrrolidone, acrylamides, conjugated dienes, vinyl ketones, vinyl chloride and the like. Preferred among them are those having a (meth)acrylic group, which are similar to the polymer of the invention. The anion-polymerizable group includes (meth)acrylic groups, styrene, acrylonitrile, N-vinylpyrrolidone, acrylamides, conjugated dienes, vinyl ketones and the like. Among them, those having an acrylic functional group, which are similar to the polymer of the invention, are preferred.

As specific examples of the above monomers, there may be mentioned (meth)acrylate monomers, cyclic acrylates, N-vinylpyrrolidone, styrenic monomers, acrylonitrile, N-vinylpyrrolidone, acrylamide monomers, conjugated diene monomers and vinyl ketone monomers, among others. As the (meth)acrylate monomers, there may be mentioned n-butyl (meth)acrylate, 2-ethylhexyl (meth)acrylate, isooctyl (meth)acrylate, isononyl (meth)acrylate and compounds of the following formulas:

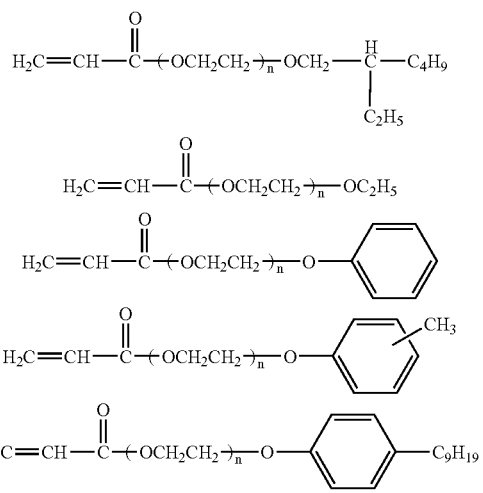

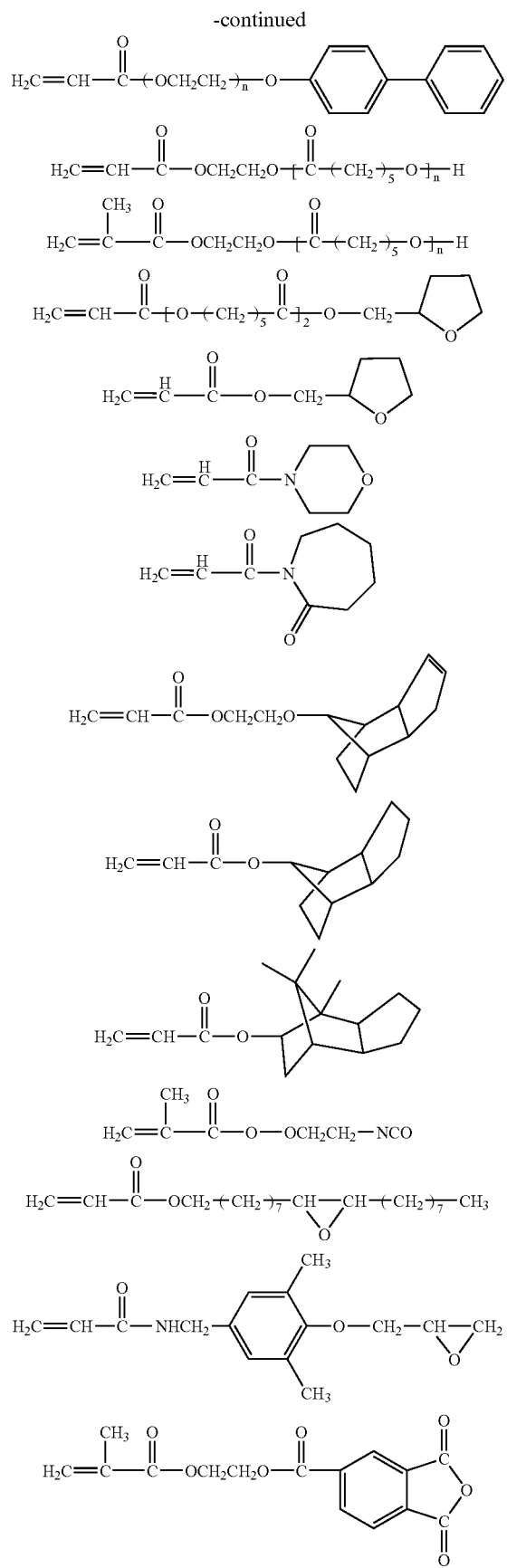
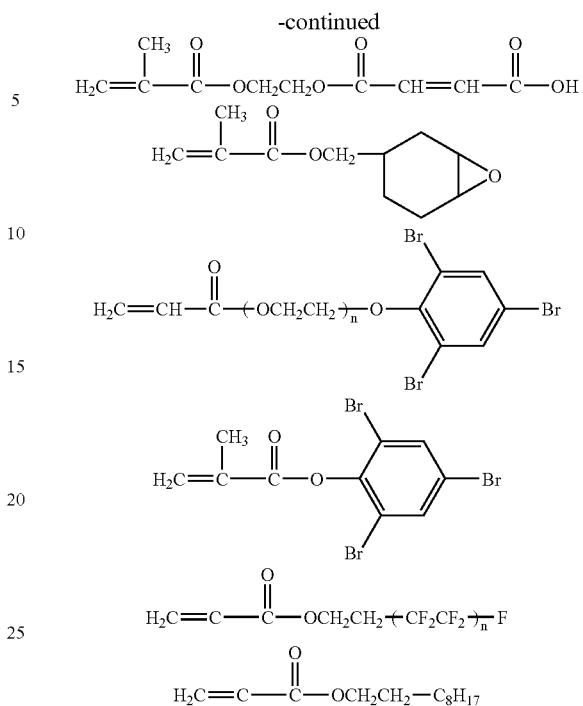

The styrenic monomers include styrene, α-methylstyrene, etc., the acrylamide monomers include acrylamide, N,N-dimethylacrylamide, etc., the conjugated diene monomers include butadiene, isoprene, etc., and the vinyl ketone monomers include methyl vinyl ketone and the like.

As polyfunctional monomers, there may be mentioned neopentyl glycol polypropoxy diacrylate, trimethylolpropane polyethoxy triacrylate, bisphenol F polyethoxy diacrylate, bisphenol A polyethoxy diacrylate, dipentaerythritol polyhexanolide hexaacrylate, tris(hydroxyethyl)isocyanurate polyhexanolide triacrylate, tricyclodecane dimethylol diacrylate 2-(2-acryloyloxy-1,1-dimethyl)-5-ethyl-5-acryloyloxymethyl-1,3-dioxane, tetrabromobisphenol A diethoxy diacrylate, 4,4-dimercaptodiphenyl sulfide dimethacrylate, polytetraethylene glycol diacrylate, 1,9-nonanediol diacrylate, ditrimethylolpropane tetraacrylate, etc.

As the oligomers, there may be mentioned epoxy acrylate resins such as bisphenol A-based epoxy acrylate resins, phenol novolak-based epoxy acrylate resins and cresol novolak-based epoxy acrylate resins, COOH-modified epoxy acrylate resins, urethane acrylate resins produced by reacting urethane resins obtained from a polyol (e.g. polytetramethylene glycol, polyester diol from ethylene glycol and adipic acid, ε-caprolactone-modified polyester diol, polypropylene glycol, polyethylene glycol, polycarbonate diol, hydroxyl-terminated hydrogenated polyisoprene, hydroxyl-terminated polybutadiene, hydroxyl-terminated polyisobutylene) and an organic isocyanate (e.g. tolylene diisocyanate, isophoronediisocyanate, diphenylmethanediisocyanate, hexamethylene diisocyanate, xylylene diisocyanate) with a hydroxyl-containing (meth)acrylate [e.g. hydroxyethyl (meth)acrylate, hydroxypropyl (meth)acrylate, hydroxybutyl (meth)acrylate, pentaerythritol triacrylate], resins resulting from the introduction of a (meth) acrylic group(s) into the above polyols via an ester bond, polyester acrylate resins, etc.

From among these monomers and oligomers, appropriate ones are selected according to the initiator and curing conditions to be used.

The monomers and/or oligomers having an acrylic functional group preferably have a number average molecular weight of not more than 2,000, more preferably for the reason that the compatibility is good, not more than 1,000.

The method of curing such photo- and/or electron beam-curable composition is not particularly restricted but includes the irradiation of light and/or electron beams using a high pressure mercury lamp, low pressure mercury lamp, electron beam irradiating apparatus, halogen lamp, light emitting diode or semiconductor laser, for instance, according to the properties of the photopolymerization initiator employed.

The vinyl polymer according to the third aspect of the invention can be utilized not only in the above-mentioned photo- and/or electron beam-curable composition but also in various curable compositions and, further, as a macromonomer. The curable composition of the invention may vary widely in form, from rubber-like to resin-like, according to the molecular weight and main chain skeleton of the polymer. Therefore, as specific uses of the curable composition of the invention, there may be mentioned sealing compositions, adhesives, pressure-sensitive adhesives, elastic adhesives, coatings, powder coatings, foamed products, potting agents for electric and electronic fields, films, gaskets, resists, various molding materials, artificial marble and solon.

<Heat-Curable Composition>

In the following, a curable composition according to the invention which can be cured upon heating is described.

The heat-curable composition of the invention preferably contains a heat polymerization initiator.

The heat polymerization initiator to be used in the practice of the invention is not particularly restricted but includes azo initiators, peroxides, persulfuric acid and redox initiators.

Suitable azo initiators include, but are not limited to, 2,2'-azobis(4-methoxy-2,4-dimethylvaleronitrile) (VAZO 33), 2,2'-azobis(2-amidinopropane)dihydrochloride (VAZO 50), 2,2'-azobis(2,4-dimethylvaleronitrile) (VAZO 52), 2,2'-azobis(isobutyronitrile) (VAZO 64), 2,2'-azobis-2-methylbutyronitrile (VAZO 67) and 1,1-azobis(1-cyclohexanecarbonitrile) (VAZO 88) (all available from du Pont Chemical), 2,2'-azobis(2-cyclopropylpropionitrile) and 2,2'-azobis(methyl isobutyrate) (V-601) (available from Wako Pure Chemical Industries), among others.

Suitable peroxide initiators include, but are not limited to, benzoyl peroxide, acetyl peroxide, lauroyl peroxide, decanoyl peroxide, dicetyl peroxydicarbonate, di(4-tert-butylcyclohexyl) peroxydicarbonate (Perkadox 16S) (available from Akzo Nobel), di(2-ethylhexyl) peroxy dicarbonate, tert-butyl peroxypivalate (Lupersol 11) (available from Elf Atochem), tert-butyl peroxy-2-ethylhexanoate (Trigonox 21-C50) (available from Akzo Nobel) and dicumyl peroxide, among others.

Suitable persulfate initiators include, but are not limited to, potassium persulfate, sodium persulfate and ammonium persulfate.

Suitable redox (oxidation-reduction) initiators include, but are not limited to, combinations of the above-mentioned persulfate initiators with a reducing agent such as sodium hydrogen metasulfite or sodium hydrogen sulfite; systems based on an organic peroxide and a tertiary amine, for example the system based on benzoyl peroxide and dimethylaniline; and systems based on an organic hydroperoxide and a transition metal, for example the system based on cumene hydroperoxide and cobalt naphthenate, among others.

Other initiators include, but are not limited to, pinacols such as tetraphenyl-1,1,2,2-ethanediol, among others.

Preferred heat radical initiators are selected from the group consisting of azo initiators and peroxide initiators. More preferred are 2,2'-azobis(methyl isobutyrate), tert-butyl peroxypivalate and di(4-tert-butylcyclohexyl)peroxydicarbonate, and mixtures of these.

In the practice of the third aspect of the invention, the thermal initiators are present in a catalytically effective amount, and such amount is not restricted but, typically, is about 0.01 to 5 parts by weight, more preferably about 0.025 to 2 parts by weight, per 100 parts by weight of the total amount of the polymer having an acrylic functional group at one or more termini thereof, of the invention, and the other monomer and oligomer mixture added. In cases where a mixture of initiators is used, the total amount of the initiator mixture is selected as if only one initiator species were used.

The curable composition according to the third aspect of the invention basically comprises the above components as main components. Preferably, it is free of any other polymerizable monomer so that the residual monomer odor problem may be cleared up. According to the intended purpose, however, a polymerizable monomer and/or oligomer and/or various additives may be used combinedly. Preferred as the polymerizable monomer and/or oligomer are a monomer and/or oligomer having a radical-polymerizable group or a monomer and/or oligomer having an anion-polymerizable group. As the radical-polymerizable group, there may be mentioned acrylic functional groups such as a (meth)acrylic group, as well as styrene, acrylonitrile, vinyl esters, N-vinylpyrrolidone, acrylamides, conjugated dienes, vinyl ketones, vinyl chloride and the like. Preferred among them are those having a (meth)acrylic group, which are similar to the polymer of the invention. The anion-polymerizable group includes (meth)acrylic groups, styrene, acrylonitrile, N-vinylpyrrolidone, acrylamides, conjugated dienes, vinyl ketones and the like. Among them, those having an acrylic functional group, which are similar to the polymer of the invention, are preferred.

As specific examples of the above monomers, there may be mentioned, among others, those (meth)acrylate monomers, cyclic acrylates, N-vinylpyrrolidone, styrenic monomers, acrylonitrile, N-vinylpyrrolidone, acrylamide monomers, conjugated diene monomers and vinyl ketone monomers mentioned hereinabove referring to the photo- and/or electron beam-curable composition.

From among these monomers and oligomers, appropriate ones are selected according to the initiator and curing conditions to be used.

The monomer and/or oligomer having an acrylic functional group preferably has a number average molecular weight of not more than 2,000, more preferably for the reason that the compatibility is good, not more than 1,000.

The method of curing the heat-curable composition is not particularly restricted but, generally, the temperature is preferably within the range of 50° C. to 200° C., more preferably within the range of 70° C. to 130° C., although it may vary depending on the thermal initiator, the species of the polymer of the invention, having an acrylic functional group at one or more termini thereof, and the compound(s) added. The curing time may vary according to the polymerization initiator, monomer, solvent and reaction temperature used, among others but, generally, is within the range of 1 minute to 10 hours.

The polymer according to the third aspect of the invention can be utilized not only in the above-mentioned heat-curable composition but also in various curable compositions and, further, as a macromonomer. The curable composition of the invention may vary widely in form, from rubber-like to resin-like, according to the molecular weight and main chain skeleton of the polymer. Therefore, as specific uses of the curable composition of the invention, there may be mentioned sealing compositions, adhesives, pressure-sensitive adhesives, elastic adhesives, coatings, powder coatings, foamed products, potting agents for electric and electronic fields, films, gaskets, resists, various molding materials, artificial marble and so on.

<Another Mode of Curing>

Further, it is also expected here that the polymer having an acrylic functional group at one or more termini thereof, of the invention, can be caused to cure through the addition of an amine crosslinking agent, namely via the Michael addition reaction.

BEST MODES FOR CARRYING OUT THE INVENTION

The following examples illustrate the invention. They are, however, by no means limitative of the scope of the invention.

In the following examples and comparative examples, "part(s)" and "%" mean "part(s) by weight" and "% by weight", respectively.

In the examples, the "number average molecular weight" and "molecular weight distribution (ratio between weight average molecular weight and number average molecular weight)" were calculated by the standard polystyrene equivalent method using gel permeation chromatography (GPC). Columns packed with crosslinked polystyrene gels were used as the GPC columns and chloroform as the GPC solvent. The $^1$H NMR measurement was made in CDCl$_3$ using Varian Gemini 300 MHz.

PRODUCTION EXAMPLE 1

Synthesis of alkenyl-terminated poly(butyl acrylate)

A 2-liter separable flask equipped with a reflux condenser and a stirrer was charged with CuBr (3.39 g, 0.059 mol) and the reaction vessel inside was purged with nitrogen. Acetonitrile (111.9 mL) was added and the contents were stirred on an oil bath at 70° C. for 40 minutes. Thereto were added butyl acrylate (200 g), diethyl 2,5-dibromoadipate (23.4 g, 0.065 mol) and pentamethyldiethylenetriamine (0.5 mL) (hereinafter referred to as "triamine") to thereby initiate the reaction. While heating at 70° C. with stirring, butyl acrylate (800 g) was continuously added dropwise. During adding dropwise butyl acrylate, the triamine (2.5 mL) was added. After the lapse of 380 minutes following reaction initiation, 1,7-octadiene (288 mL, 215 g, 1.95 mol) and the triamine (4.0 mL) were added and the resulting mixture was further heated at 70° C. with stirring for 8 hours.

The reaction mixture was diluted with toluene and passed through an activated alumina column and the volatile matter was then distilled off under reduced pressure to give a polymer [1].

A 2-liter separable flask equipped with a reflux condenser was charged with the above polymer [1] (1000 g), potassium benzoate (34.8 g) and N,N-dimethylacetamide (1000 mL) and the contents were heated at 100° C. with stirring under nitrogen for 15 hours. The N,N-dimethylacetamide was distilled off by heating under reduced pressure and the residue was diluted with toluene. The toluene-insoluble matter (KBr and excess potassium benzoate) was filtered off using an activated alumina column. The volatile matter in the filtrate was distilled off under reduced pressure to give a polymer [2].

A 2-liter round-bottom flask equipped with a reflux condenser was charged with the polymer [2] (1000 g), aluminum silicate (200 g, product of Kyowa Chemical, Kyowaad 700 PEL) and toluene (5.0 L) and the contents were heated at 100° C. with stirring under nitrogen for 6 hours. After removal of the aluminum silicate by filtration, the toluene in the filtrate was distilled off under reduced pressure to give a polymer [3].

EXAMPLE 1

Synthesis of silanol-terminated poly(butyl acrylate)

A 30-mL pressure reactor was charged with the polymer [3] (10 g) synthesized in Production Example 1 and then purged with nitrogen. Chlorodimethylsilane (0.34 mL, 3.1 mmol), zero valence platinum-1,1,3,3-tetramethyl-1,3-divinyldisiloxane complex ($1.32 \times 10^{-6}$ mol/ml; xylene solution) (0.079 mL) and toluene (2.0 mL) were added and the contents were heated at 100° C. with stirring. Three hours later, 0.071 mL of zero valence platinum-1,1,3,3-tetramethyl-1,3-divinyldisiloxane complex ($1.32 \times 10^{-6}$ mol/ml; xylene solution) was added and heating was continued at 100° C. with stirring for further 6 hours. The volatile matter of the reaction mixture was distilled off by heating at 80° C. under reduced pressure to give chloro-dimethyl-terminated poly(butyl acrylate) (polymer [5]).

The polymer [5] was dissolved in tetrahydrofuran (10 mL) and the solution was heated at 50° C. with stirring. A 10% aqueous solution of NaHCO$_3$ (10 mL) was added dropwise and the mixture was further heated with stirring for 1 hour. The reaction mixture was transferred to a seperatory funnel, ethyl acetate (20 mL) was added, and the organic layer was washed with brine. The organic layer was dried over Na$_2$SO$_4$ and filtered and the solvent was then distilled off by heating under reduced pressure to give silanol-terminated poly (butyl acrylate) (polymer [6]).

EXAMPLE 2

Production of Cured Product

A composition was prepared by mixing up 100 parts of the polymer [6] obtained in Example 1, 3 parts of methyltriisopropenoxysilane and 1 part of a tin catalyst. The composition was cast into a form and allowed to cure at room temperature, whereby a cured product having rubber-like elasticity was obtained.

EXAMPLE 3

Synthesis of methacryloyl-terminated poly(butyl acrylate)

In a 10-mL flask was weighed 1.00 g of the polymer [6] obtained in Example 1 and, after nitrogen purging, tetrahydrofuran (1.5 mL) was added. After addition of triethylamine (0.022 mL, 0.16 mmol), 3-methacryl-oxypropyldimethylchlorosilane (0.023 mL, 0.10 mmol) was added. The mixture became turbid, whereby the formation of a salt could be confirmed. After several hours of stirring at room temperature, the mixture was diluted with toluene and the dilution was purified by filtration to give the desired methacryloyl (CH$_2$=C(CH$_3$)CO$_2$—)-terminated poly(butyl acrylate) (polymer [7]). The structure was confirmed by $^1$H NMR.

EXAMPLE 4

Synthesis of diisopropenoxymethylsilyl-terminated poly(butyl acrylate)

In a 10-mL flask was weighed 1.00 g of the polymer [6] obtained in Example 1 and, after nitrogen purging, tetrahydrofuran (1.5 mL) was added. Methyltriisopropenoxysilane (0.12 mL, 0.47 mmol) was added and the mixture was stirred at 50° C. The volatile matter was distilled off using an evaporator. No gelation occurred and the desired diisopropenoxymethylsilyl-terminated poly(butyl acrylate) (polymer [8]) was obtained as an oil. The structure was confirmed by $^1$H NMR.

INDUSTRIAL APPLICABILITY

The silanol- or hydrolyzable silyl-terminated vinyl polymer of the invention, which is preferably produced by utilizing the technique of living radical polymerization, more preferably atom transfer radical polymerization, is well controlled in structure, for example it is high in functionalization rate and narrow in molecular weight distribution. Therefore, it produces a lower viscosity as compared with those polymers produced by conventional radical polymerization and comparable in molecular weight, hence it is expected that when it is used in a curable composition, it will be easy to handle the composition. Furthermore, this polymer can give a highly curable composition.

The vinyl polymer of the invention having an acrylic functional group at one or more termini thereof, too, is well controlled in functional group introduction rate and molecular weight distribution, among others, since it is preferably obtained by living radical polymerization, more preferably by atom transfer radical polymerization. Thus, when this polymer is used in various curable compositions, it is possible to improve and control the physical properties.

The invention claimed is:

1. A process for preparing a vinyl polymer having a silanol group at one or more termini thereof, which comprises:
   (1) synthesizing a vinyl polymer by living radical polymerization,
   (2) subjecting a compound having at least two low-polymerizable alkenyl groups to reaction as a second monomer at the final stage of said polymerization or after completion of the reaction involving a predetermined monomer(s) to thereby sythesize a vinyl polymer having an alkenyl group at one or more one termini thereof,
   (3) carrying out the hydrosilylation reaction of said vinyl polymer having an alkenyl group at one or more one termini thereof with a silicon compound having both a silicon atom-bound hydrolyzable group and a hydrosilyl group, and
   (4) converting said hydrolyzable group to a silanol group by hydrolysis.

2. A process for preparing a vinyl polymer having a silanol group at one or more termini thereof, which comprises:
   (1) synthesizing a vinyl polymer having a halogen atom at one or more one termini thereof by atom transfer radical polymerization,
   (2) reacting said vinyl polymer having a halogen atom at one or more one termini thereof with an alkenyl-containing oxyanion represented by the general formula (9) or an alkenyl-containing carboxylate anion represented by the general formula (10) to thereby substitute said alkenyl group for said halogen atom:

$$CH_2=C(R^7)-R^{14}-O^-M^+ \quad (9)$$

wherein R$^7$ represents a hydrogen atom or a methyl group and they may be the same or different, R$^{14}$ represents a divalent organic group containing 1 to 20 carbon atoms, which may optionally contain one or more ether bonds, and M$^+$ represents an alkali metal ion or a quaternary ammonium ion;

$$CH_2=C(R^7)-R^{14}-C(O)O^-M^+ \quad (10)$$

wherein R$^7$ represents a hydrogen atom or a methyl group and they may be the same or different, R$^{14}$ represents a divalent organic group containing 1 to 20 carbon atoms, which may optionally contain one or more ether bonds, and M$^+$ represents an alkali metal ion or a quaternary ammonium ion,
   (3) carrying out the hydrosilylation reaction of a vinyl polymer having an alkenyl group at one or more one termini thereof obtained above reaction (2) with a silicon compound having both a silicon atom-bound hydrolyzable group and a hydrosilyl group, and
   (4) converting said hydrolyzable group to a silanol group by hydrolysis.

3. The process according to claim 1 or 2, wherein the main chain of said vinyl polymer having a silanol group at one or more termini thereof is obtained by the polymerization of at least one monomer selected from the group consisting of (meth)acrylic monomers, acrylonitrile monomers, aromatic vinyl monomers, fluorine-containing vinyl monomers and silicon-containing vinyl monomers.

4. The process according to claim 1 or 2, wherein the silanol group is represented by the general formula (1):

$$-[Si(R^1)_{2-b}(OH)_bO]_m-Si(R^2)_{3-a}(OH)_a \quad (1)$$

wherein R$^1$ and R$^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by (R')$_3$SiO—, in which R' is a monovalent hydrocarbon group containing 1 to 20 carbon atoms and the three R' groups may be the same or different; when there are two or more R$^1$ or R$^2$ groups, they may be the same or different; a represents 0, 1, 2 or 3, b represents 0, 1 or 2, and m is an integer of 0 to 19, provided that the relation a+mb≧1 should be satisfied.

5. The process according to claim 4,
wherein, in general formula (1), m=0.

6. The process according to claim 1 or 2,
wherein said vinyl polymer having a silanol group at one or more termini thereof has a ratio (Mw/Mn) of weight average molecular weight (Mw) to number average molecular weight (Mn) of less than 1.8 as determined by gel permeation chromatography.

7. The process according to claim 1,
wherein the living radical polymerization is carried out in the manner of atom transfer radical polymerization.

8. The process according to claim 2 or 7,
wherein a metal complex to be used as a catalyst for the atom transfer radical polymerization is a copper, nickel, ruthenium or iron complex.

9. The process according to claim 2 or 7,
wherein the catalyst for atom transfer radical polymerization is a copper complex.

10. The process according to claim 1 or 2,
wherein the silicon compound having both a silicon atom-bound hydrolyzable group and a hydrosilyl group is chlorodimethylsilane.

11. A curable composition prepared according to claim 1 or 2, and
which further comprises a polymer,
said polymer having a silicon atom-bound hydrolyzable group(s) and no silanol group.

12. The curable composition according to claim 11,
wherein the polymer having a silicon atom-bound hydrolyzable group(s) and no silanol group has a skeleton comprising at least one polymer selected from the group consisting of polysiloxane polymers, polyether polymers, hydrocarbon polymers and vinyl polymers.

13. The curable composition according to claim 12,
wherein the polymer having a silicon atom-bound hydrolyzable group(s) and no silanol group has a skeleton comprising at least one polymer selected from the group consisting of polyisobutylene, (meth)acrylic polymers and styrenic polymers.

* * * * *